United States Patent
Xu et al.

(10) Patent No.: US 11,501,637 B2
(45) Date of Patent: Nov. 15, 2022

(54) METHOD, APPARATUS, AND SYSTEM FOR DETECTING LANE-LEVEL SLOWDOWN EVENTS

(71) Applicant: HERE GLOBAL B.V., Eindhoven (NL)

(72) Inventors: Jingwei Xu, Chicago, IL (US); Yuxin Guan, Chicago, IL (US); Bruce Bernhardt, Chicago, IL (US); Zongyi Xuan, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 179 days.

(21) Appl. No.: 16/593,656

(22) Filed: Oct. 4, 2019

(65) Prior Publication Data
US 2021/0104155 A1    Apr. 8, 2021

(51) Int. Cl.
*G08G 1/01*    (2006.01)
*B60W 30/09*    (2012.01)
(Continued)

(52) U.S. Cl.
CPC ........... *G08G 1/0133* (2013.01); *B60W 30/09* (2013.01); *B60W 30/181* (2013.01);
(Continued)

(58) Field of Classification Search
CPC .. G08G 1/0133; G08G 1/0141; G08G 1/0145; G08G 1/162; B60W 30/09;
(Continued)

(56) References Cited

U.S. PATENT DOCUMENTS

2007/0152804 A1*  7/2007  Breed ................... B60W 30/16
                                                            340/435
2008/0021613 A1    1/2008  Hamaguchi et al.
(Continued)

OTHER PUBLICATIONS

Office Action for related European Patent Application No. 20199807.7-1206, dated Feb. 25, 2021, 10 pages.
(Continued)

*Primary Examiner* — Yuen Wong
(74) *Attorney, Agent, or Firm* — Ditthavong, Steiner & Mlotkowski

(57) ABSTRACT

An approach is provided for detecting lane-level dangerous slowdown events based on probe data and/or sensor data. The approach, for example, involves splitting probe data, sensor data, or a combination thereof into at least one vehicle trajectory, wherein the data is collected from one or more vehicles traveling on a road segment. For each vehicle trajectory of the at least one vehicle trajectory, the approach also involves processing said each vehicle trajectory to detect a slowdown event based on a speed reduction greater than a threshold reduction. The approach further involves classifying a slowdown event type of the slowdown event based on a final driving location, a final driving speed, or a combination thereof of the at least one vehicle trajectory. The approach further involves providing the slowdown event, the slowdown event type, or a combination thereof as an output for the road segment.

20 Claims, 17 Drawing Sheets

(51) Int. Cl.
- *B60W 30/18* (2012.01)
- *B60W 50/14* (2020.01)
- *G08G 1/16* (2006.01)
- *G06V 20/58* (2022.01)
- *G06V 20/56* (2022.01)

(52) U.S. Cl.
CPC .............. *B60W 50/14* (2013.01); *G06V 20/58* (2022.01); *G06V 20/588* (2022.01); *G08G 1/0141* (2013.01); *G08G 1/0145* (2013.01); *G08G 1/162* (2013.01); *B60W 2050/146* (2013.01)

(58) Field of Classification Search
CPC ............... B60W 30/181; B60W 50/14; B60W 2050/146; G06K 9/00798; G06K 9/00805
See application file for complete search history.

(56) References Cited

U.S. PATENT DOCUMENTS

| | | |
|---|---|---|
| 2008/0040004 A1 | 2/2008 | Breed |
| 2009/0140887 A1 | 6/2009 | Breed et al. |
| 2013/0275033 A1 | 10/2013 | Bastiaensen et al. |
| 2014/0148972 A1 | 5/2014 | Basir et al. |
| 2016/0009276 A1 | 1/2016 | Moeller |
| 2016/0163198 A1 | 6/2016 | Dougherty |
| 2017/0072851 A1* | 3/2017 | Shenoy .................. B60Q 9/008 |
| 2017/0076598 A1* | 3/2017 | Scofield ........... G08G 1/096725 |

OTHER PUBLICATIONS

Lv Bin et al., "LiDAR-Enhanced Connected Infrastructures Sensing and Broadcasting High-Resolution Traffic Information Serving Smart Cities", vol. 7, Jun. 17, 2019, pp. 79895-79907.

* cited by examiner

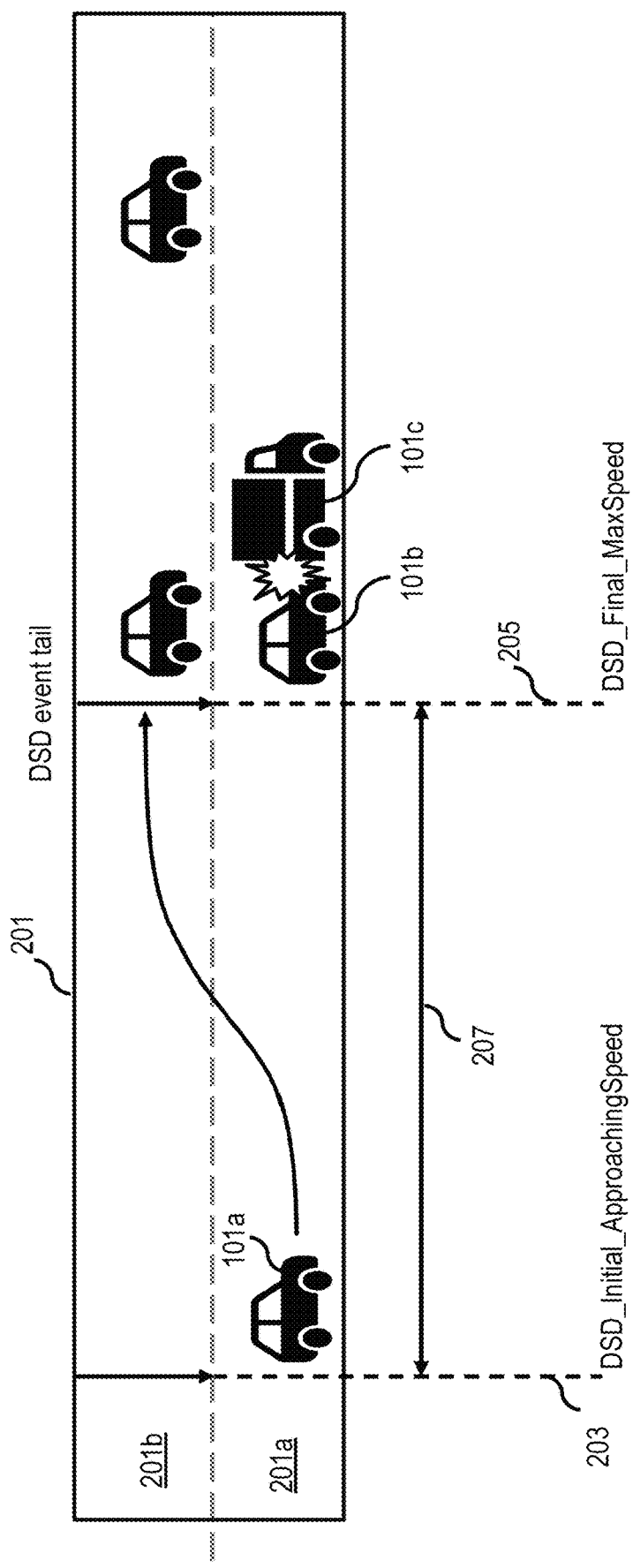

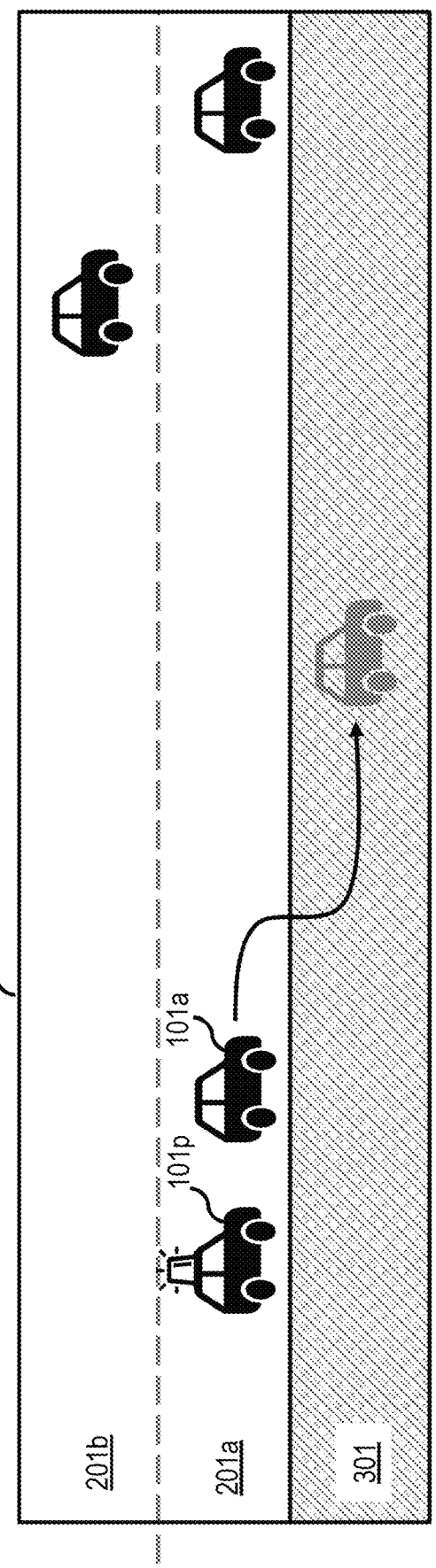

METHOD, APPARATUS, AND SYSTEM FOR DETECTING LANE-LEVEL SLOWDOWN EVENTS

BACKGROUND

Navigation and mapping service providers are continually challenged to provide digital maps of increasing levels of granularity to support advanced applications such as autonomous driving. For example, providing users up-to-date data on traffic flow and dangerous slowdown events (e.g., accidents or bottlenecks) can potentially reduce congestion and improve safety. Safe autonomous operations generally require the map data to provide at least a lane-level granularity (e.g., so that navigation systems can generate lane-level routing). However, service providers often only report real-time static incidents on a specific road segment, which can quickly become out of date in terms of time and/or location relative to dynamic traffic events. In addition, service providers face significant technical challenges to provide lane-level map data due to, for instance, the resources needed to collect lane-level data, and/or location sensor accuracy limitations and errors traditionally used to generate digital map data. Accordingly, mapping service providers face significant technical challenges to detect lane-level dangerous slowdown events with confidence and low latency.

SOME EXAMPLE EMBODIMENTS

Therefore, there is a need for detecting lane-level dangerous slowdown events with confidence and low latency.

According to one embodiment, a method comprises splitting probe data, sensor data, or a combination thereof into at least one vehicle trajectory, wherein the probe data, the sensor data, or a combination thereof is collected from one or more vehicles traveling on a road segment. For each vehicle trajectory of the at least one vehicle trajectory, the method also comprises processing said each vehicle trajectory to detect a slowdown event based on a speed reduction greater than a threshold reduction. The method further comprises classifying a slowdown event type of the slowdown event based on a final driving location, a final driving speed, or a combination thereof of the at least one vehicle trajectory. The method further comprises providing the slowdown event, the slowdown event type, or a combination thereof as an output for the road segment.

According to another embodiment, an apparatus comprises at least one processor, and at least one memory including computer program code for one or more computer programs, the at least one memory and the computer program code configured to, with the at least one processor, cause, at least in part, the apparatus to split probe data, sensor data, or a combination thereof into at least one vehicle trajectory, wherein the probe data, the sensor data, or a combination thereof is collected from one or more vehicles traveling on a road segment. For each vehicle trajectory of the at least one vehicle trajectory, the apparatus is also caused to process said each vehicle trajectory to detect a slowdown event based on a speed reduction greater than a threshold reduction. The apparatus is further caused to classify a slowdown event type of the slowdown event based on a final driving location, a final driving speed, or a combination thereof of the at least one vehicle trajectory. The apparatus is further caused to provide the slowdown event, the slowdown event type, or a combination thereof as an output for the road segment.

According to another embodiment, a computer-readable storage medium carries one or more sequences of one or more instructions which, when executed by one or more processors, cause, at least in part, an apparatus to split map-matched probe data, sensor data, or a combination thereof into at least one vehicle trajectory, wherein the probe data, the sensor data, or a combination thereof is collected from one or more vehicles traveling on a road segment. For each vehicle trajectory of the at least one vehicle trajectory, the apparatus is also caused to process said each vehicle trajectory to detect a lane-level slowdown event based on a speed reduction greater than a threshold reduction. The apparatus is further caused to classify a lane-level slowdown event type of the lane-level slowdown event based on a final driving location, a final driving speed, or a combination thereof of the at least one vehicle trajectory. The apparatus is further caused to provide the lane-level slowdown event, the lane-level slowdown event type, or a combination thereof as an output for the road segment.

According to another embodiment, an apparatus comprises means for splitting probe data, sensor data, or a combination thereof into at least one vehicle trajectory, wherein the probe data, the sensor data, or a combination thereof is collected from one or more vehicles traveling on a road segment. For each vehicle trajectory of the at least one vehicle trajectory, the apparatus also comprises means for processing said each vehicle trajectory to detect a slowdown event based on a speed reduction greater than a threshold reduction. The apparatus further comprises means for classifying a slowdown event type of the slowdown event based on a final driving location, a final driving speed, or a combination thereof of the at least one vehicle trajectory. The apparatus further comprises means for providing the slowdown event, the slowdown event type, or a combination thereof as an output for the road segment.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3A-3E are diagrams of example dangerous slowdown event categories, according to one embodiment;

DESCRIPTION OF SOME EMBODIMENTS

Examples of a method, apparatus, and computer program for detecting lane-level dangerous slowdown events based on probe data and/or sensor data are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
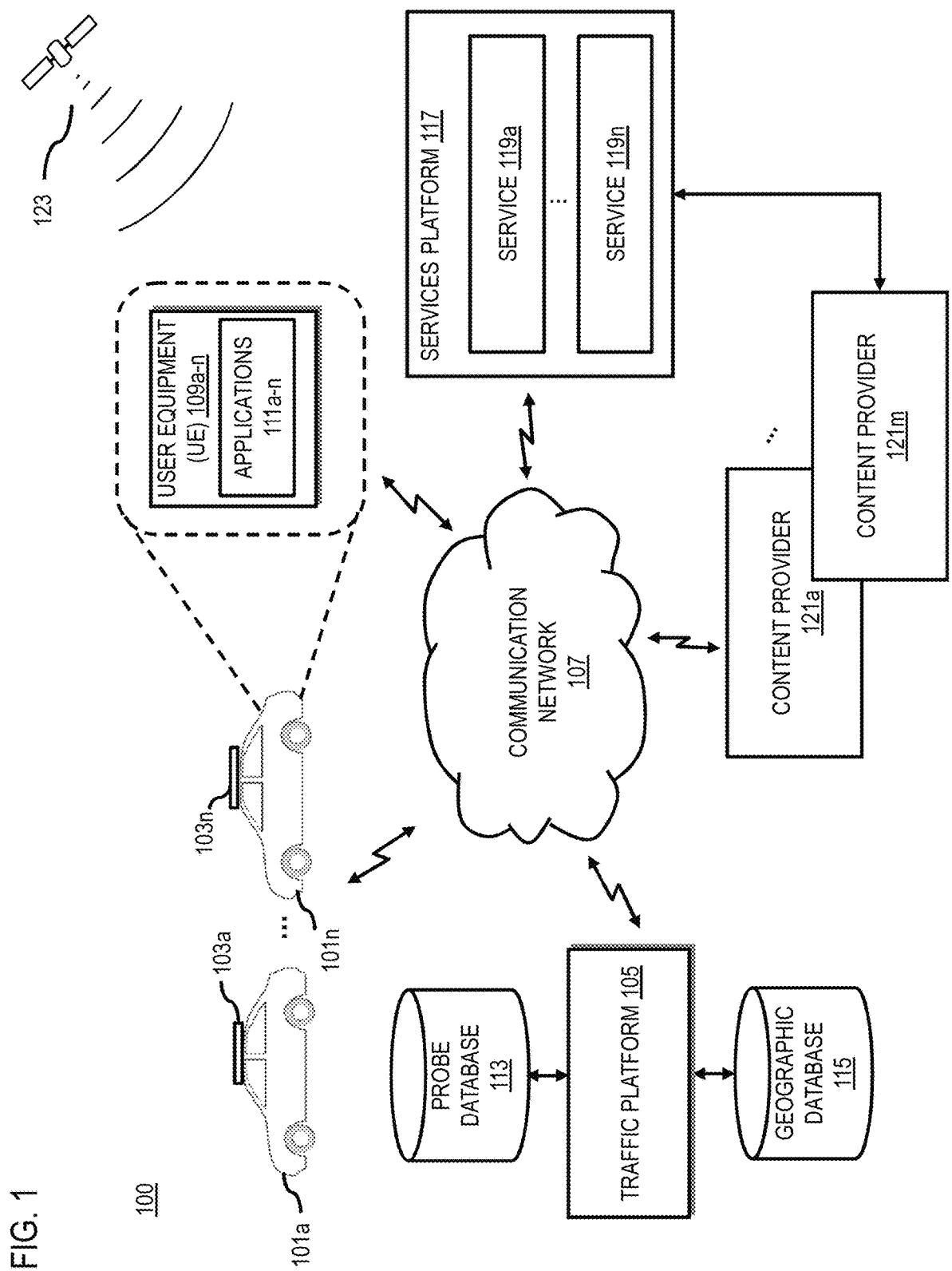
FIG. 1 is a diagram of a system capable of detecting lane-level dangerous slowdown events based on probe data and/or sensor data, according to one embodiment.

FIG. 1 is a diagram of a system capable of detecting lane-level dangerous slowdown events based on probe data and/or sensor data (i.e., with confidence and low latency), according to one embodiment. Automated driving has been a hot trend in recent years and is quickly becoming a reality following advances in machine learning, computer vision, and compute power. Generally, an autonomous vehicle is a vehicle driving on the road without human intervention. The term "autonomous vehicle" is often used interchangeably with driverless car and/or robot car. An autonomous vehicle uses different sensor technologies (e.g., a camera sensor, Light Detection and Ranging (LiDAR), etc.) and a high-definition (HD) map or dynamic backend content including traffic information services to travel on a road network with little or no human intervention.

Providing users of autonomous or semi-autonomous vehicles (e.g., drivers or passengers) with up-to-date data on traffic flow and lane-level dangerous slowdown events can potentially reduce congestion and improve safety on the road network. A slowdown event (e.g., a congestion queue/jam) may occur and/or start accumulating as a result of any number of occurrences, such as traffic volume exceeding available road capacity, a traffic accident, normal rush hour traffic flow on a specific road segment, and/or as a result of a largescale public event such as a professional sports event or concert. In some instances, dangerous queueing situations can result in significant crashes or bottlenecks and these bottlenecks may even sometimes lead to secondary crashes, and on occasion, catastrophic events (e.g., multi-vehicle pileups).

However, obtaining up-to-date data on traffic flow and lane-level dangerous slowdown events is particularly challenging. For example, it is critical to be aware of these events in under 10 minutes, and ideally even faster so that navigation systems can generate safe lane-level routing and/or re-routing. Traditional traffic service providers can report real-time static incidents on a specific road segment and send, if appropriate, warning messages to drivers driving upstream ahead of incidents based on multiple input resources (e.g., local or community resources, service providers, regulators, etc.). However, this information can quickly become out of date and/or stale with respect to dynamic traffic slowdown events (i.e., the reported time and/or location of the event may quickly become inapplicable or inaccurate). In such cases, users of a traffic service that rely on problematic data can suffer from unexpected delays, reroutes, etc. As a result, users may gradually lose their trust in the service if such events occur frequently. To minimize this risk, traffic service providers have traditionally deployed human resources to monitor closures from multiple sources and to report incidents accurately. However, human or manual monitoring and verification can be resource intensive and may not scale well. For example, as the number of dangerous slowdown events increase (e.g., with increased coverage area), so does the labor cost and chances for human errors. Accordingly, mapping service providers face significant technical challenges to detect lane-level dangerous slowdown events with confidence and low latency.

To address these problems, the system 100 of FIG. 1 introduces a capability to detect lane-level dangerous traffic slowdown events (e.g., traffic congestion queue/jam) based on probe data and/or sensor data and to generate relevant lane-level dangerous slowdown messages to warn upstreaming users (e.g., of autonomous vehicles, highly assisted driving (HAD) vehicles, or semi-autonomous vehicles) of an approaching dangerous traffic area or lane (e.g., via multiple traffic message channels (TMCs)) with a confidence value (e.g., from 0 to 1) and a severity factor (e.g., from 1 to 4).

In one embodiment, the system 100 collects a plurality of instances of probe data and/or vehicle sensor data from one or more vehicles 101*a*-101*n* (also collectively referred to as vehicles 101) (e.g., autonomous vehicles, HAD vehicles, semi-autonomous vehicles, etc.) having one or more vehicle sensors 103*a*-103*n* (also collectively referred to as vehicle sensors 103) (e.g., LiDAR, global positioning system (GPS), camera sensor, etc.) and having connectivity to the traffic platform 105 via the communication network 107. In one instance, probe data may be reported as probe points, which are individual data records collected at a point in time that records telemetry data for that point in time. A probe point can include attributes such as: (1) probe ID, (2) longitude, (3) latitude, (4) heading, (5) speed, and (6) time.

In one instance, the system 100 can also collect the real-time probe data and/or sensor data from one or more user equipment (UE) 109*a*-109*n* (also collectively referenced to herein as UEs 109) associated with the a vehicle 101 (e.g., an embedded navigation system), a user or a passenger of a vehicle 101 (e.g., a mobile device, a smartphone, etc.), or a combination thereof. In one instance, the UEs 109 may include one or more applications 111*a*-111*n* (also collectively referred to herein as applications 111) (e.g., a navigation or mapping application). In one instance, the system 100 may also collect the probe data and/or sensor data from one or more other sources such as government/municipality agencies, local or community agencies (e.g., a police department), and/or third-party official/semi-official sources (e.g., a services platform 117, one or more services 119*a*-119*n*, one or more content providers 121*a*-121*m*, etc.). In one embodiment, the probe data and/or sensor data collected by the vehicle sensors 103, the UEs 109, one or more other sources, or a combination thereof may be stored in the probe database 113, the geographic database 115, or a combination thereof.

In one embodiment, the system 100 map-matches the probe data and/or sensor data to each individual lane of the road geometry network. For instance, the probe data and/or sensor data may be collected from vehicles 101 traveling on multi-lane roadways within the road network. In one embodiment, the probe data and/or sensor data corresponding to each lane can then be processed and classified by the system 100 as separate respective vehicle paths or trajectories on the HD map. More specifically, in one embodiment, the system 100 map matches the probe data and/or sensor data by processing the raw location data (e.g., probe data comprising GPS trace points or other location data) to identify which road, path, link, etc. and which lane of each road, path, link, etc. a probe device (e.g., a vehicle 101, a UE 109, etc.) is travelling. For example, the probe data can contain individual drives by multiple vehicles 101 that need to be split and tracked on the HD map. The map matching process, for example, enables the system 100 to correlate each drive of a vehicle 101 to a corresponding segment of the road network.

In one embodiment, the system 100 processes each map-matched path or trajectory to determine whether a lane-level dangerous slowdown event is detected. In one instance, the system 100 can calculate a confidence value based on the detection (e.g., from 0 to 1), wherein the value 1 represents a confidence that the detection of a lane-level dangerous slowdown event exceeds a certain threshold (e.g., more than likely). In one embodiment, the system 100 processes each path or trajectory using a dangerous slowdown detection (DSD) algorithm. For example, the system 100 detects a DSD event when a vehicle 101 speed is reduced by X % within Y seconds of the vehicle's travel time, which the system 100 can determine as follows:

1. Define DSD_Initial_ApproachingSpeed
2. Define DSD_Final_MaxSpeed
3. Define $\Delta$t
4. Define $\Delta$Speed=DSD_Initial_ApprochingSpeed−DSD_Final_MaxSpeed

```
Algorithm DSD_Event_Detection
    Input: P, a sorted list of a vehicle's path probe points by GPS
    timestamp.
    Output: DSD event.
    if P.size = 0 return null
    for each probe point in P,
    do if
        i < j for all p[i], p[j] ∈ P,
        p[i].speed >= DSD_Initial_ApprochingSpeed,
        p[j].speed <= DSD_Final_MaxSpeed,
        delta time (p[j].time − p[i].time) < Δt
    return a DSD event composed of {p[i], p[j]} pair
    return null
```

Figure 2:
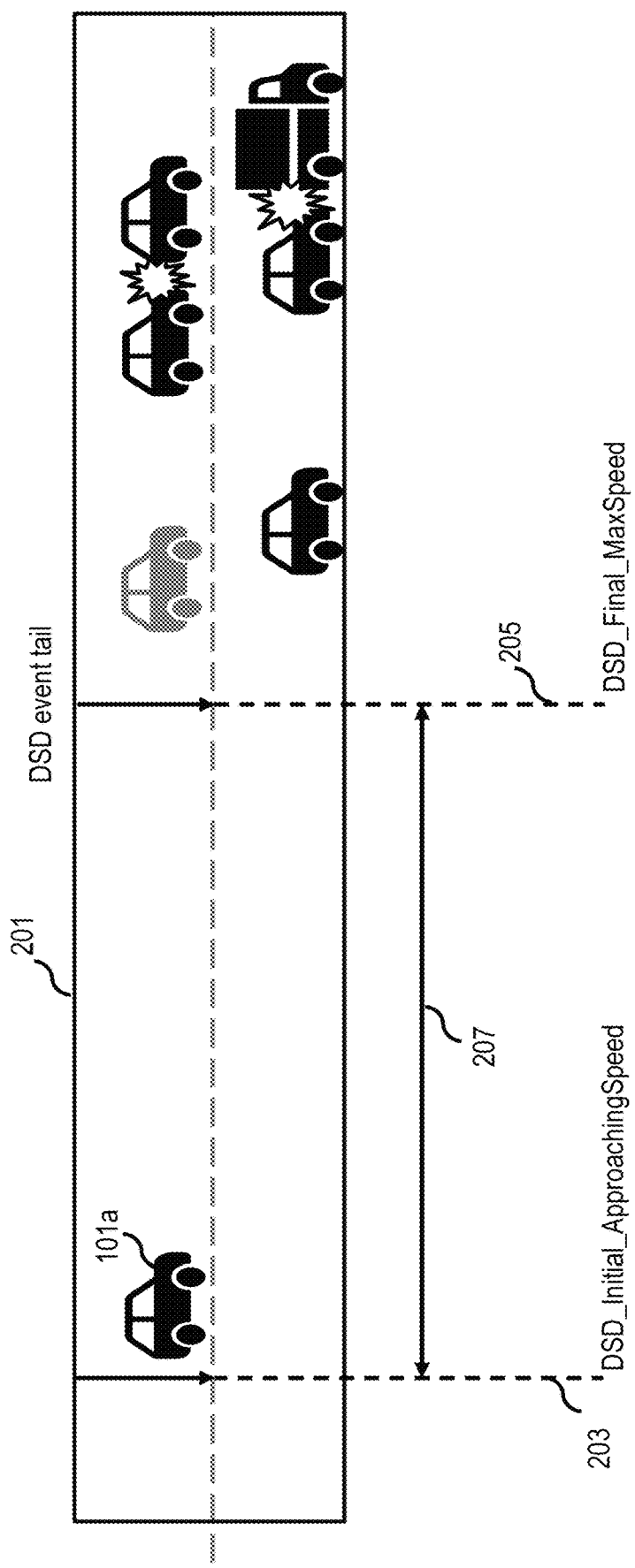
FIG. 2 is a diagram of an example dangerous slowdown event, according to one embodiment.

Referring to FIG. 2, the system 100 determines or detects the initial approaching speed of a vehicle 101 (e.g., based on probe data and/or sensor data on the road segment 201 at an initial time (t1) (DSD_Initial_ApproachingSpeed) (203) and the final max speed of the vehicle 101 on the road segment 201 at a later time (t2) (DSD_Final_MaxSpeed) (205). In one embodiment, the system 100 can then determine the elapsed time or time change 207 ($\Delta$t) (e.g., t2−t1) and the speed change (e.g., DSD_Initial_ApproachingSpeed−DSD_Final_MaxSpeed), which the system 100 then uses to determine whether a lane-level dangerous slowdown event has occurred on the road segment 201. In one instance, the system 100 determines that a lane-level dangerous slowdown event did occur when the speed of the vehicle 101*a* decreased significantly between t1 (203) and t2 (205) (e.g., the vehicle 101*a* speed is reduced by X % within Y seconds). In one embodiment, the system 100 may also take into consideration the rate of speed reduction on that road segment relative to free flow traffic and/or a historic traffic flow and/or one or more same or similar temporal and/or contextual conditions (e.g., time, weather, etc.).

In one embodiment, the system 100 can calculate a confidence value (e.g., from 0 to 1) for each lane-level dangerous slowdown detection. In one instance, the confidence value is based on a threshold percentage (e.g., X %) within a certain amount of time (e.g., Y seconds) of a vehicle 101's travel time. In another instance, the confidence value may be based on a comparison by the system 100 of any later probe data map-matched onto a road segment against the historical baseline or reference model for that road segment. For example, a confidence value of 1 represents probe data and/or sensor data that meets or exceeds a threshold value relative to the historical baseline or reference model for that road segment and a confidence value of 0 represents probe data that fails to meet the threshold.

In one embodiment, the system 100 can determine the confidence value based on the likelihood of such observation (i.e., what is the probability that the recent observation is consistent with what was expected). The system 100 can use different statistical or probability models to describe the probe activity distribution (e.g., probe count distribution) for the historic and/or the observed, depending on the properties of the underlying probe data or probe data providers (e.g., content providers 121a-121m). In other words, the system 100 can use any suitable statistic or discrete probability distribution to determine the odds or the likelihood of the observed probe activity such as but not limited to a Poisson distribution, a Gaussian approximation of the Poisson distribution, or equivalent.

In one embodiment, the system 100 can also assign a severity factor or danger level (e.g., from 1 to 4) to each detected dangerous slowdown event or category (e.g., based on the impact of the event on travel delays or other traffic disruptions). It is contemplated that the severity level can be expressed using, for instance, any number of categories or degrees of severity (e.g., low severity, medium severity, high severity, etc.).

In one embodiment, once the system 100 detects a lane-level dangerous slowdown event (e.g., with a confidence of 1), the system 100 categorizes each lane-level dangerous slow down or stop event type based on at least the initial speed, initial driving lane, final speed, and final driving lane of a vehicle 101 (e.g., vehicle 101a).

In one instance, the system 100 can use steering wheel angle vehicle sensor data (e.g., from a vehicle sensor 103) and other sensor data (e.g., from a UE 109) to categorize the lane-level dangerous slowdown or stop event type as follows:

---

PROTOBUF DEFINITION: steeringWheelAngle_deg
DATA TYPE: int32
MANDATORY/OPTIONAL: Optional
UNIT: Degree
RANGE: [−1080, 1080]
RESOLUTION: 1°
DESCRIPTION: The steering wheel angle. Where 0 is the angle of the steering wheel where the vehicle is driving straight. A positive value describes a rotated steering wheel to the left, a negative value describes a rotated steering wheel to the right.

---

Figure 3B:
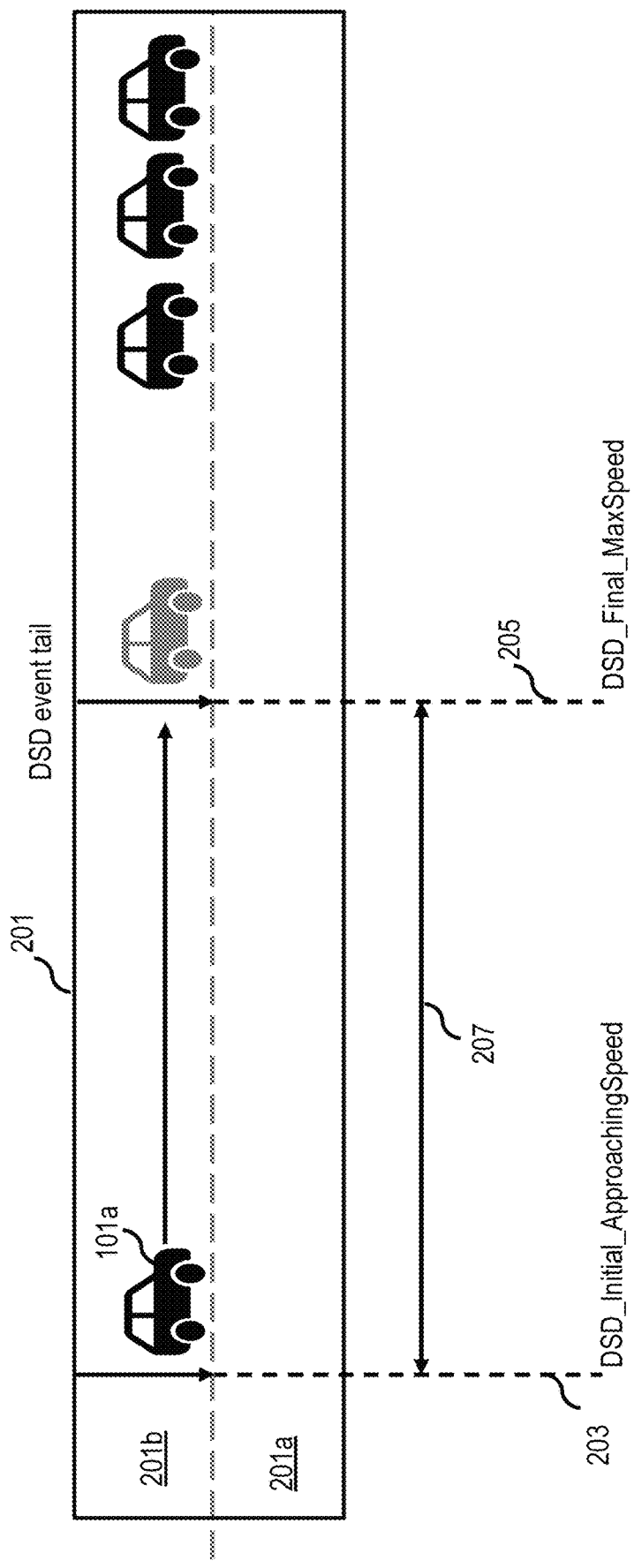
Figure 3C:
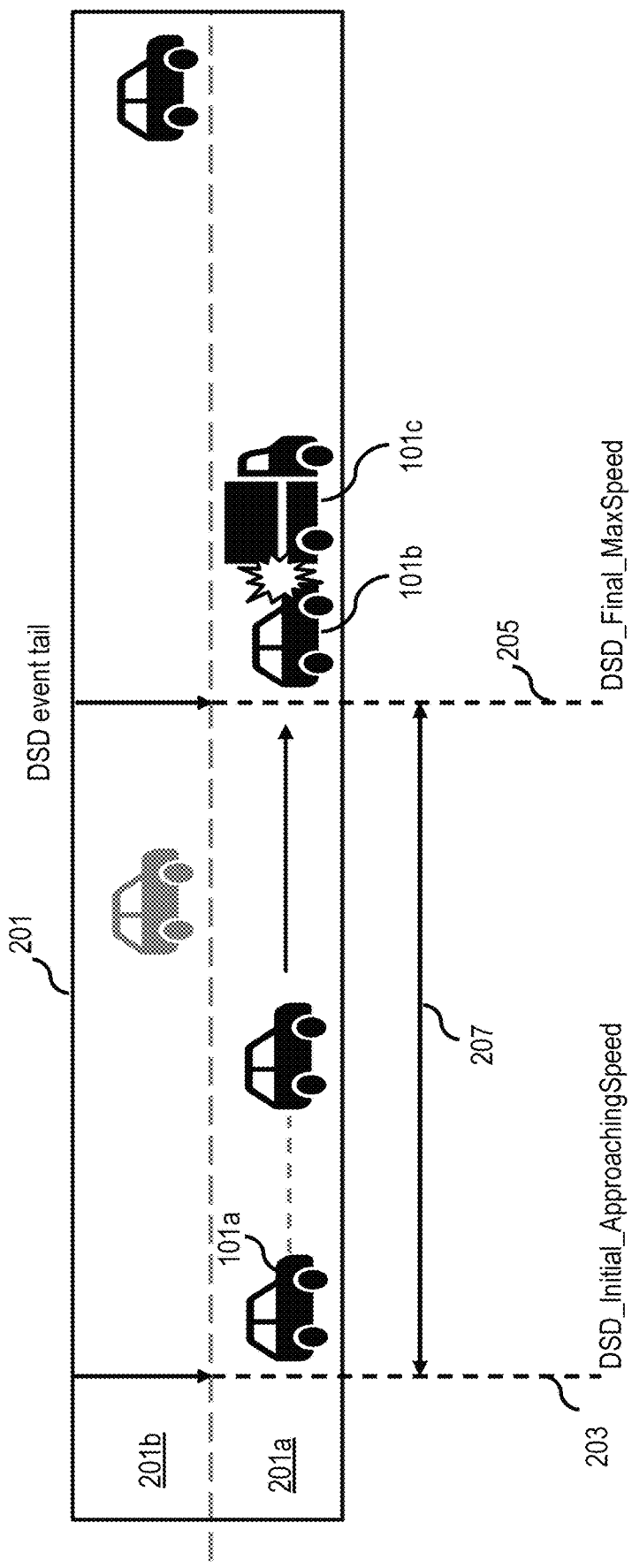
Figure 3E:
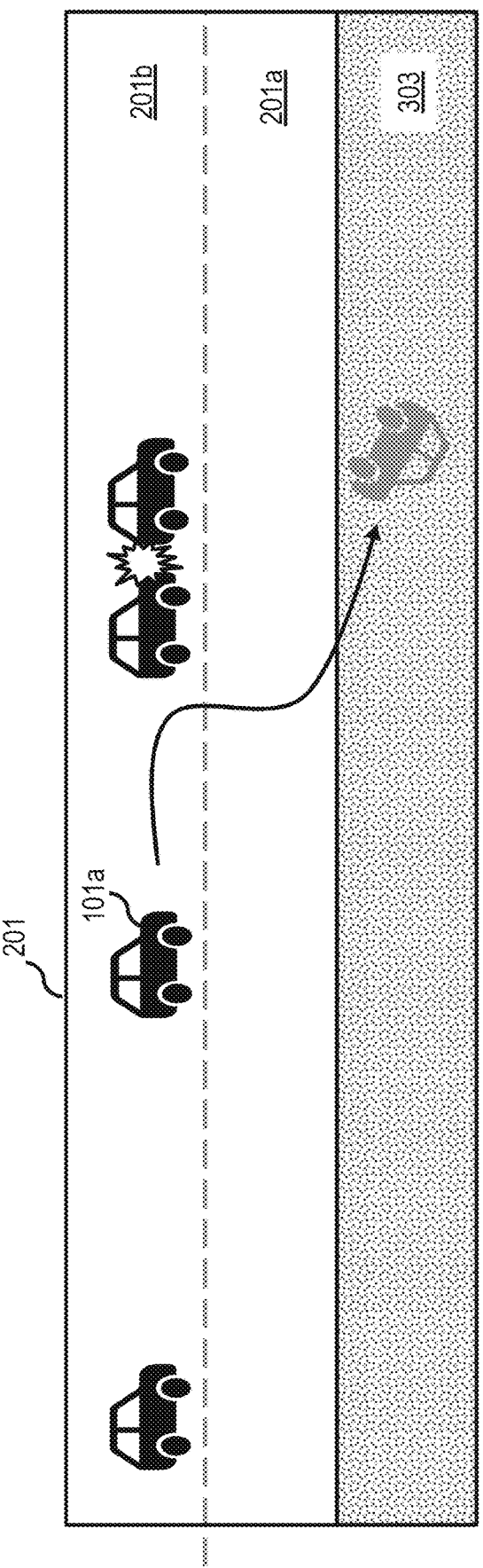

In one embodiment, the system 100 can categorize each detected DSD event based on, but not limited to, whether the event of interest occurs in the same lane as the lane that the vehicle of interest (e.g., vehicle 101a) is initially traveling; whether the final spot of the vehicle 101a is on the shoulder, the driving lane, off the road etc. (i.e., a different location from the initial lane); and whether the final driving speed of the vehicle 101a is below a first and/or a second speed threshold. In one instance, the first threshold is always greater than the speed of the second threshold and the second threshold is approximately 0 miles per hour (mph) or kilometers per hour (kph). In one instance, the results of the above determination by the system 100 may be separated into one of the following four event types or categories: (1) dangerous slowdown and departure to a different lane (FIG. 3A); (2a) dangerous slowdown on the same lane because of congestion (FIG. 3B); (2b) dangerous stop on the same lane because of heavy congestion or incident (FIG. 3C); (3) sudden stop on a shoulder of the road (FIG. 3D); and (4) stop off of the road (FIG. 3E).

In one embodiment, the system 100 can characterize a lane-level dangerous slowdown event based on a determination of a dangerous slowdown and departure to a different lane (i.e., the initial lane and the final lane are not the same). Referring to FIG. 3A, in one embodiment, the system 100 can characterize the dangerous slowdown event based on the determination that the initial lane 201a of the vehicle 101a (e.g., an autonomous vehicle) at the DSD_Initial_Approaching Speed (203) (e.g., t1) and the final lane 201b of the vehicle 101 at the DSD_Final_MaxSpeed (205) (e.g., t2) are not the same. For example, the vehicle 101 in this instance may have departed lane 201a to avert an upcoming incident (e.g., the accident between vehicles 101b and 101c), road construction, etc. in that lane.

In one embodiment, the system 100 can characterize a lane-level dangerous slowdown event based on a determination of a dangerous slowdown on the same lane (i.e., the initial lane and the finale lane are the same). For example, the system 100 can characterize the lane-level dangerous slowdown event based on the determination that the initial lane 201b of the vehicle 101a (e.g., an autonomous vehicle) at the DSD_Initial_Approaching Speed (203) (e.g., t1) and the final lane 201b of the vehicle 101 at the DSD_Final_MaxSpeed (205) (e.g., t2) are the same, as depicted in FIG. 3B. For example, the initial lane and the final lane in this instance are the same lane because of the congestion ahead on lane 201b.

In one instance, the system 100 can also characterize a lane-level dangerous slowdown event based on a determination of a dangerous stop on the same lane (i.e., the initial lane and the final lane are the same). For example, the system 100 can characterize the dangerous stop event based on the determination that the initial lane 201a of vehicle 101a (e.g., an autonomous vehicle) at the DSD_Initial_Approaching Speed (203) (e.g., t1) and the final lane 201a of the vehicle 101 at the DSD_Final_MaxSpeed (205) (e.g., t2) are the same, as depicted in FIG. 3C. In this instance, for example, the initial lane and the final lane are the same because of heavy congestion or an incident ahead (e.g., an accident between vehicles 101b and 101c) on lane 201a.

In one embodiment, the system 100 characterizes a lane-level dangerous slowdown or stop event based on the determination that the final lane of the vehicle 101a is not a drivable lane of the road 201. For example, the system 100 can characterize the lane-level dangerous slowdown (stop) event based on the determination that the final location of the vehicle 101a is on the shoulder 301 of the road 201, as depicted in FIG. 3D. In one instance, the vehicle 101a may have been pulled over due to one or more driving violations (e.g., by a police vehicle 101p), due to one or more mechanical issues (e.g., a flat tire), etc. In another example, the system 100 can characterize the lane-level dangerous slowdown (stop) event based on the determination that the final location of the vehicle 101a off the road 201, as depicted in FIG. 3E. For example, the vehicle 101a may have fallen or rolled over the road 201 onto a cliff or hillside 303. In one instance, the system 100 can be determine that the final lane of the vehicle 101a is not a drivable lane of the road 201 by augmenting one or more different vehicle sensors 103 (e.g., steering wheel sensor, tilt sensor, etc.).

In one embodiment, the system 100 delivers the dangerous slowdown event messages along with a confidence value (e.g., from 0 to 1), a severity factor (e.g., 1 to 4), and an event type if necessary via one or more data messages over the air radio interface, transport protocol experts group (TPEG) service by connected hypertext transfer protocol (HTTP) or user datagram protocol (UDP), and/or dedicated short range communications (DSRC) broadcasting data (e.g., via the communication network 107). In one instance, the system 100 can deliver a lane-level dangerous slowdown event messages to a vehicle 101, a user of the vehicle 101 (e.g., a driver or a passenger), or a combination thereof via a UE 109 (e.g., an embedded navigation system, a mobile device, or a combination thereof) and/or an application 111 running on the UE 109. In one example, a governmental agency (e.g., a police force) can use the lane-level dangerous slowdown event information to better position service patrol resources (i.e., highway helper trucks). In another instance, a service provider (e.g., a service 119) can alert all mobile phone users in a targeted area (e.g., through geofencing) using an emergency messaging system (e.g., the communication network 107). Consequently, the categorization of the various lane-level dangerous slowdown events by the system 100 and the provision of corresponding messages to users can improve driver and vehicle awareness of the current state of the road network and the reasons for an update or the change in the status of the safety messages. In addition, in one embodiment, the lane level DSD event information can be further used to improve autonomous driving safety (e.g., in terms of routing or guidance).

Figure 4:
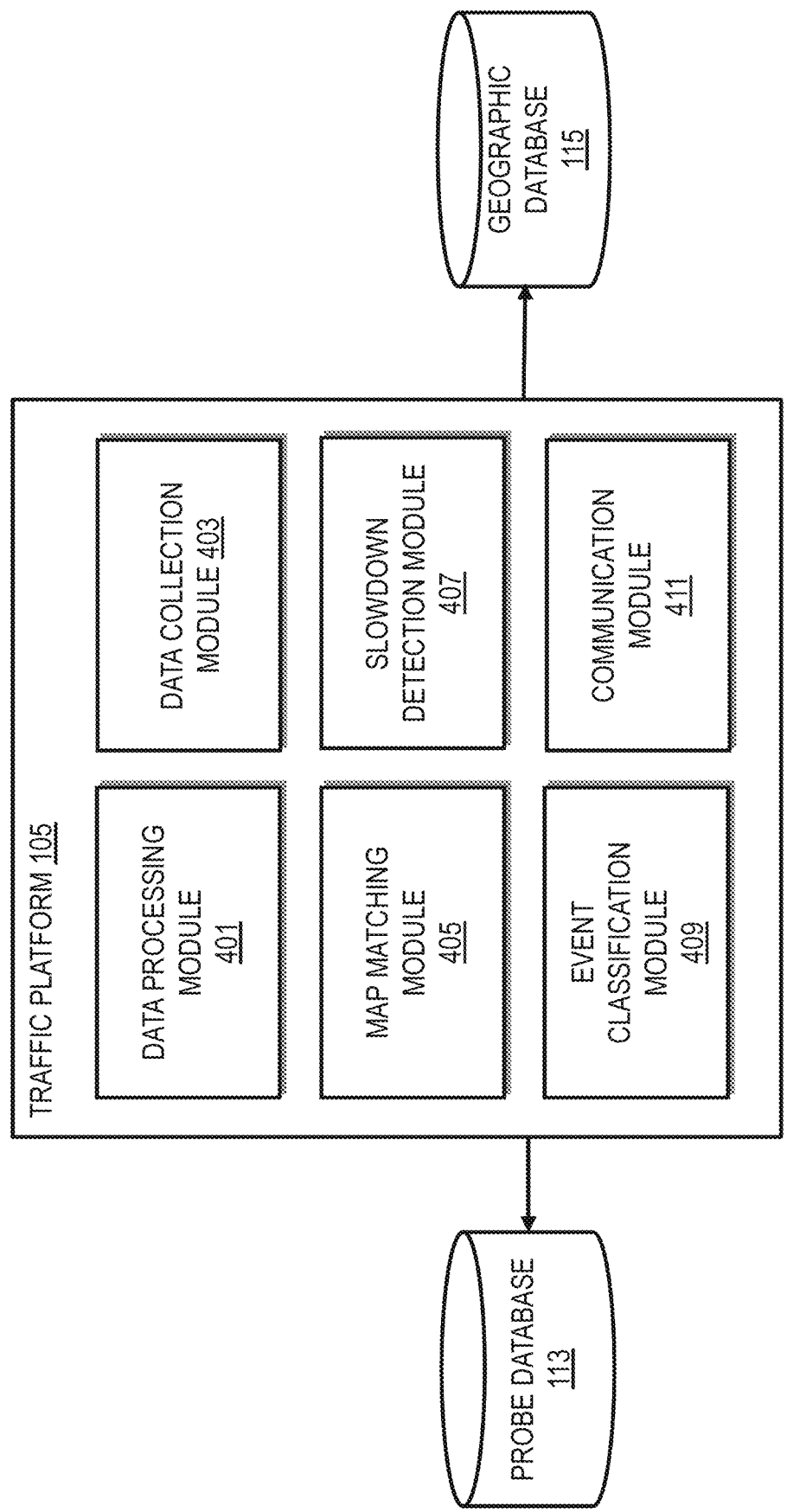
FIG. 4 is a diagram of components of a traffic platform capable of detecting lane-level dangerous slowdown events based on probe data and/or sensor data, according to one embodiment.

FIG. 4 is a diagram of the components of the traffic platform 105, according to one embodiment. By way of example, the traffic platform 105 includes one or more components for detecting lane-level dangerous slowdown events based on probe data and/or sensor data, according to the various embodiments described herein. It is contemplated that the functions of these components may be combined or performed by other components of equivalent functionality. In one embodiment, the traffic platform 105 includes a data processing module 401, a data collection module 403, a map matching module 405, a slowdown detection module 407, an event classification module 409, a communication module 411, and has connectivity to the probe database 113 and the geographic database 115. The above presented modules and components of the traffic platform 105 can be implemented in hardware, firmware, software, or a combination thereof. Though depicted as a separate entity in FIG. 1, it is contemplated that the traffic platform 105 may be implemented as a module of any other component of the system 100. In another embodiment, the traffic platform 105 and/or the modules 401-411 may be implemented as a cloud-based service, local service, native application, or combination thereof. The functions of the traffic platform 105 and/or the modules 401-411 are discussed with respect to FIG. 5.

Figure 5:
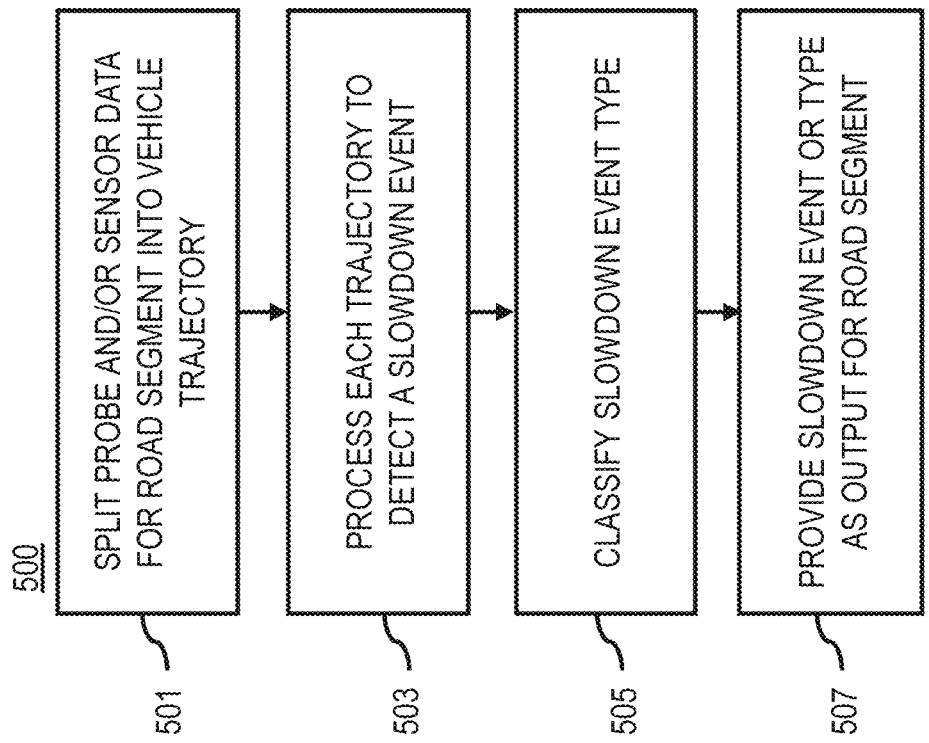
FIG. 5 is a flowchart of a process for detecting lane-level dangerous slowdown events based on probe data and/or sensor data, according to one embodiment.
Figure 9:
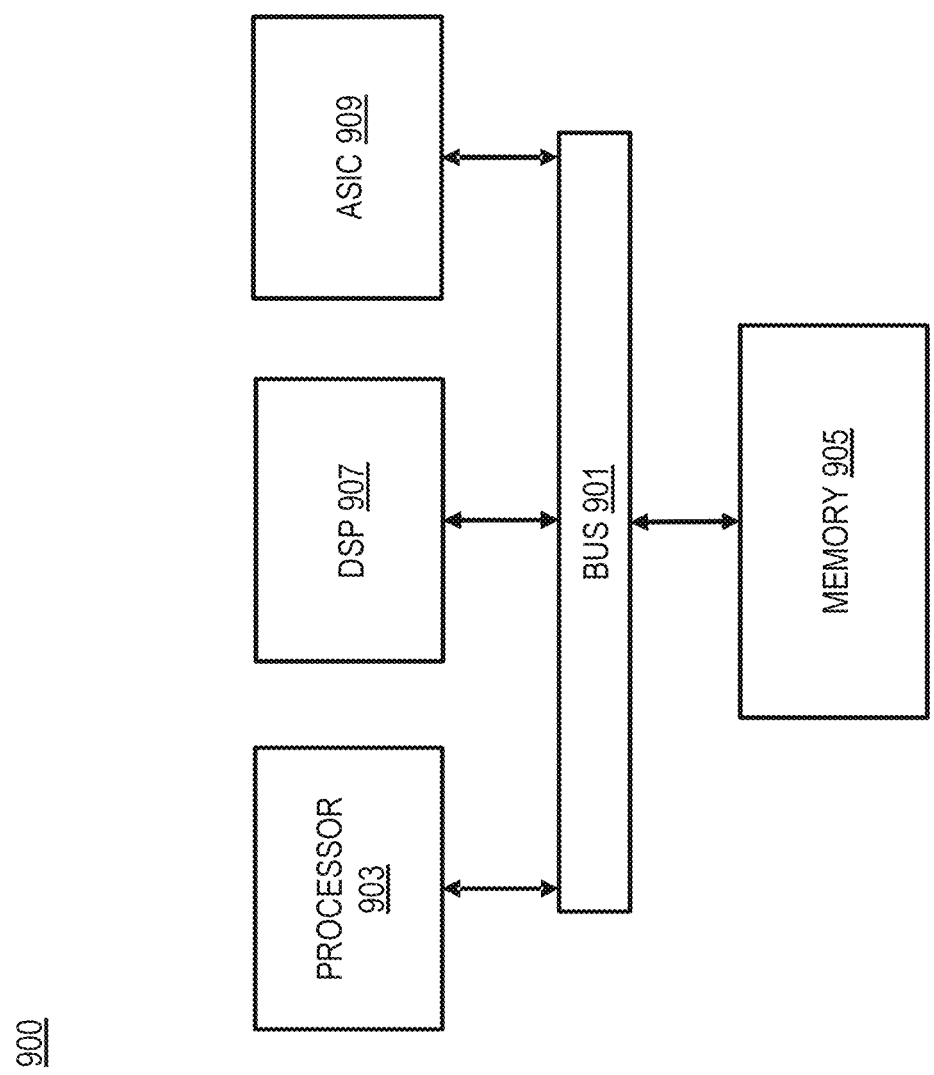
FIG. 9 is a diagram of a chip set that can be used to implement an embodiment.

FIG. 5 is a flowchart of a process for detecting lane-level dangerous slowdown events based on probe data and/or sensor data, according to one embodiment. In various embodiments, the traffic platform 105 and/or any of the modules 401-411 may perform one or more portions of the process 500 and may be implemented in, for instance, a chip set including a processor and a memory as shown in FIG. 9. As such, the traffic platform 105 and/or the modules 401-411 can provide means for accomplishing various parts of the process 500, as well as means for accomplishing embodiments of other processes described herein in conjunction with other components of the system 100. Although the process 500 is illustrated and described as a sequence of steps, its contemplated that various embodiments of the process 500 may be performed in any order or combination and need not include all the illustrated steps.

In step 501, the data processing module 401 splits probe data, sensor data, or a combination thereof into at least one vehicle trajectory, wherein the probe data, the sensor data, or a combination thereof is collected (e.g., by the data collection module 403) from one or more vehicles 101 traveling on a road segment. In one embodiment, each vehicle 101 can be configured to report probe data and/or sensor data (e.g., via a vehicle sensor 103, a UE 109, or a combination thereof) as probe points, which are individual data records collected at a point in time that records telemetry data for the vehicle 101 for that point in time. In one embodiment, a probe point may include the following five attributes (by way of illustration and not limitation): (1) probe ID; (2) longitude; (3) latitude; (4) speed; and (5) time. In one embodiment, the data processing module 401 can split all the collected probe data, sensor data, or a combination thereof per vehicle 101 based on the unique probe IDs to represent the travel trajectory or vehicle path (e.g., speed and heading) of each vehicle 101. In one instance, the probe data, sensor data, or a combination thereof collected by the vehicle sensors 103, the UEs 109, or a combination thereof may be stored in the probe database 113 before and after being split by the data processing module 401.

In one embodiment, the map matching module 405 map matches the at least one trajectory (e.g., corresponding to a vehicle 101) to a lane-level of the road segment. By way of example, the trajectory may be map-matched to the respective map or geographic records (e.g., stored in the geographic database 115) via position or GPS data associations (such as using known or future map matching or geo-coding techniques) and more specifically, the trajectory may be map-matched to individual lanes (e.g., any of the travel lanes, shoulder lanes, restricted lanes, service lanes, etc.) of the roadways by matching the geographic coordinates (e.g., longitude and latitude) between the probe data, sensor data, or a combination thereof and the respective lanes of the road segment.

In one embodiment, because the location measurement error in the probe data, sensor data, or a combination thereof (e.g., GPS error) can be greater than a lane width (making lane-level map matching (LLMM) a technical challenge), the map matching module 405 can use a probabilistic approach or other equivalent approach to perform LLMM. For example, under a probabilistic approach, the map matching module 405 first uses the raw GPS probe positions (e.g., links+latitude (lat) and longitude (lon)) for each probe to create a layer of abstraction over a digital map. In one instance, the map matching module 405 then uses the abstraction layer (<Link-ID>, <d-value>) to generate lane probabilities of probes based on their lateral position (lane distance (d-value)) within a road segment. In one embodiment, the generated lane probabilities form the emission probabilities of a statistical model (e.g., a Hidden Markov Model (HMM)) that the map matching module 405 can use to make an inference of the actual most probable lane(s) a probe trajectory traversed (e.g., one or more lanes of a multi-lane road). In one instance, the map matching module 405 can use a dynamic programming algorithm (e.g., the Viterbi algorithm) to make this inference.

In step 503, for each vehicle trajectory of the at least one vehicle trajectory, the slowdown detection module 407 processes said each vehicle trajectory to detect a slowdown event based on a speed reduction greater than a threshold reduction. In one embodiment, the slowdown detection module 407 processes each vehicle trajectory using a slowdown detection algorithm (e.g., the DSD algorithm). In one instance, the slowdown detection module 407 detects the slowdown event further based on the speed reduction of a vehicle 101 occurring within a threshold time window, a threshold distance, or a combination thereof. In one embodiment, the threshold reduction is a percent reduction (e.g., X %) from an initial speed (e.g., the DSD initial approaching speed). By way of example, the threshold reduction, the threshold time window, the threshold distance, or a combination thereof may be based on one or more historical baseline or reference models for that road segment (e.g., stored in or accessed via the geographic database 115), one or more temporal or contextual parameters (e.g., provided by a service 119, a content provider 121, or a combination thereof), or a combination thereof. In one embodiment, because each vehicle trajectory is map-matched to a lane-level of the road segment, the slowdown detection module 407 can determine the slowdown event, the slowdown event type, or a combination thereof with respect to the lane-level.

In step 505, the event classification module 409 classifies a slowdown event type of the slowdown event based on a final driving location, a final driving speed, or a combination thereof of the at least one vehicle trajectory (e.g., a vehicle 101). In one embodiment, the event classification module 409 further classifies a slowdown event, a slowdown event type, or a combination thereof based on the determination that the final driving location (e.g., at DSD_Final_MaxSpeed (205)) indicates that the slowdown event occurs on a single lane of the road segment (e.g., based on congestion, heavy congestion, an incident, etc.). In other words, the event classification module 409 determines that the initial lane and the final lane of the vehicle 101 trajectory are the same.

In one instance, the event classification module 409 further classifies a slowdown event, a slowdown event type, or a combination thereof based on the determination that the final driving location indicates that the slowdown event starts on a first lane of the road segment (e.g., lane 201*a*) and ends on a second lane of the road segment (e.g., lane 201*b*) (e.g., based on a need to avert an incident or construction in the initial lane). In other words, the event classification module 409 determines that the initial lane and the final lane of the vehicle 101 trajectory are not the same.

In one embodiment, the event classification module 409 further classifies a slowdown event, a slowdown event type, or a combination thereof based on the determination that the slowdown event starts on a travel lane of the road segment (e.g., lanes 201*a* or 201*b*) and ends on a non-travel lane of the road segment and wherein the non-travel lane includes a shoulder lane (e.g., road shoulder 301) or an off-road area of the road segment (e.g., a cliff or hillside 303). In one instance, the event classification module 409 classifies such slowdown event, slowdown event type, or a combination thereof as a vehicle stop event, a vehicle fall or roll over event, or a combination thereof.

In one instance, the event classification module 409 further classifies a slowdown event, a slowdown event type, or a combination thereof based on a comparison of the final driving speed of a vehicle 101 (e.g., at DSD_Final_MaxSpeed (205)) to a speed threshold, at least another speed threshold, or a combination thereof. In one embodiment, the speed threshold (e.g., speed threshold 1) is always greater than the at least another speed threshold (e.g., speed threshold 2) and the event classification module 409 can set the speed threshold 2, for example, as ~0 mph or kph.

In one embodiment, the event classification module 409 further classifies a slowdown event, a slowdown event type, or a combination thereof based on the data collection module 403 determining vehicle control sensor data (e.g., from a vehicle sensor 103) indicating a position of at least one vehicle control mechanism. By way of example, the vehicle control sensor data may indicate a steering wheel angle, a vehicle tilt, activation of hazard lights or the emergency brake, etc.

In step 507, the communication module 411 provides the slowdown event, the slowdown event type, or a combination thereof as an output for the road segment. By way of example, the communication module 411 may provide the output to a vehicle 101, a user of the vehicle 101 (e.g., a driver or a passenger), or a combination thereof via a UE 109 (e.g., an embedded navigation system, a mobile device, etc.) and/or an application 111 running on the UE 109 (e.g., a navigation application). For example, a user can receive a notification via a navigation or mapping application 111 of a UE 109 to avoid a road segment, a lane of a road segment, or a combination thereof based on a determination of a dangerous slowdown or stop event ahead on the road, the lane, or a combination thereof.

FIGS. 6A-6D are diagrams of example user interfaces for detecting lane-level dangerous slowdown events and delivering corresponding lane-level dangerous slowdown event messages, according to one embodiment. In this example, a UI 601 is generated for a UE 109 of an autonomous vehicle 101 (e.g., an embedded navigation system) that can enable the user (e.g., a passenger) to decide whether a navigation or guidance update is required to avoid unnecessary delay and/or a dangerous slowdown or stop event (e.g., a bottleneck or pileup).

Figure 6A:
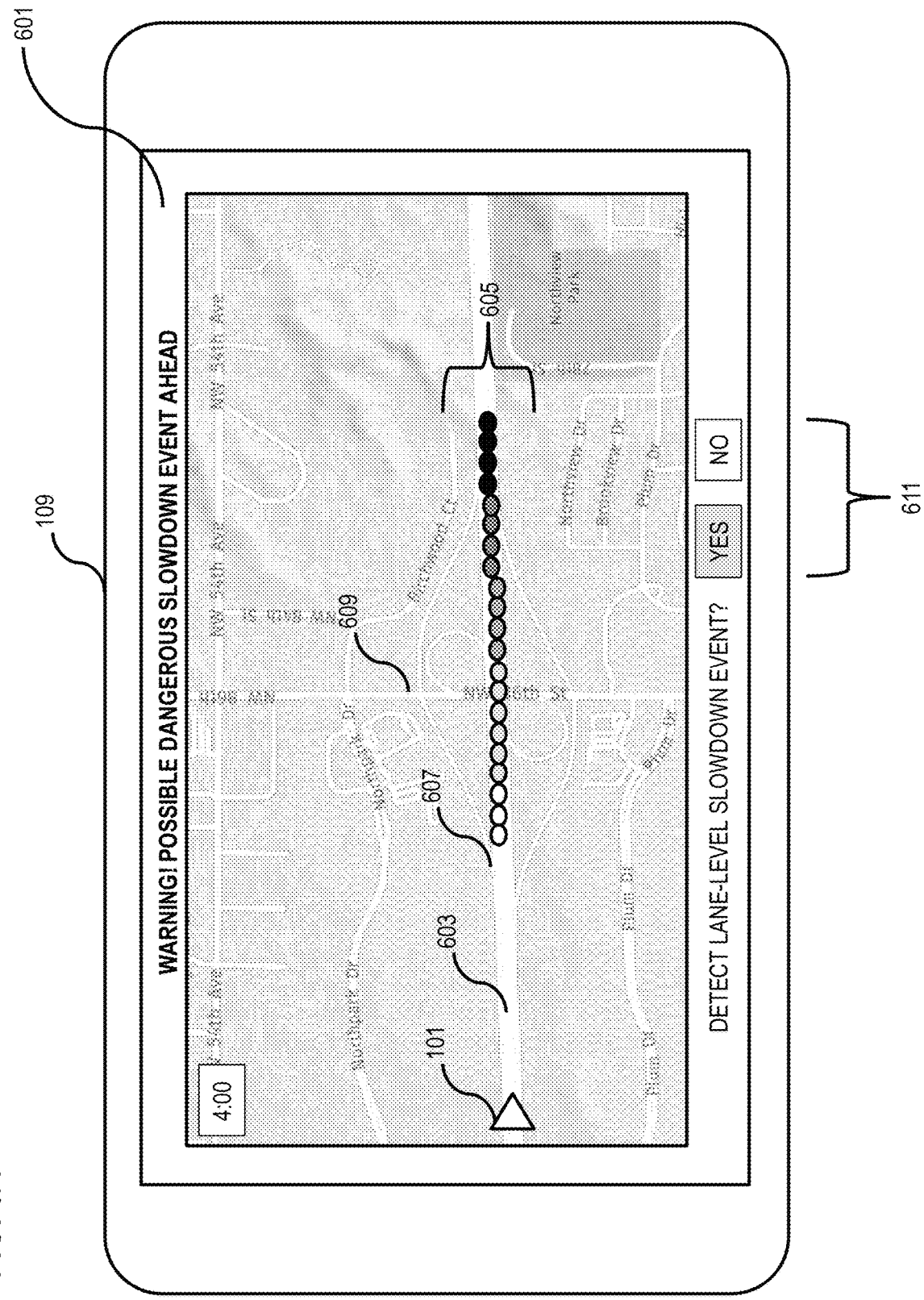
FIGS. 6A-6D are diagrams of example user interfaces for detecting lane-level dangerous slowdown events and delivering corresponding lane-level dangerous slowdown event messages, according to one embodiment.

Referring to FIG. 6A, in one embodiment, the system 100 can notify or alert the user that a "possible dangerous slowdown event" has been detected ahead on the multilane highway 603 that the vehicle 101 and the user are traveling on. In one instance, the system 100 can generate the UI 601 such that it includes a probe path visualization. In one embodiment, the system 100 can depict the probes 605 and their relative speeds on the highway 603 relative to the vehicle 101 and the user. In this example, the black dots (e.g., the furthest away from the vehicle 101) represent a speed that is below a speed threshold (e.g., standstill), the white dots (e.g., the closest to the vehicle 101) represent a speed that is above a speed threshold (e.g., free flow), and the dots in between represent decreasing speeds in-between.

At this time in the travel (e.g., 4:00), it may be unclear to the system 100 and/or the user the extent to which the slowdown event poses a danger in terms of safety and/or delay to the vehicle 101 and/or the user. For example, if the user knew the dangerous slowdown event type and the confidence value and severity factor determined by the system 100 relative to the event, the user could decide whether to take the exit 607 of the highway 603 to gain entrance to the alternative route 609. As mentioned above, it is critical to be aware of these events in under 10 minutes (e.g., the time it would take the vehicle 101 to pass the exit 607), and ideally even faster. This is particularly true in this case, where the alternative route 609 appears to be a much smaller route than the highway 603 and, therefore, would likely add considerable time to the user's trip.

In one embodiment, the system 100 can generate the UI 601 such that it includes inputs 611 to enable the user to detect a lane-level dangerous slowdown event as discussed with respect to the various embodiments described herein. By way of example, the user can interact with the inputs 611 via one or more physical interactions (e.g., a touch, a tap, a gesture, typing, etc.), one or more voice commands (e.g., "yes," "detect lane-level slowdown event," etc.), or a combination thereof. In this instance, the user has requested that the system 100 detect the lane-level slowdown event.

Figure 6B:
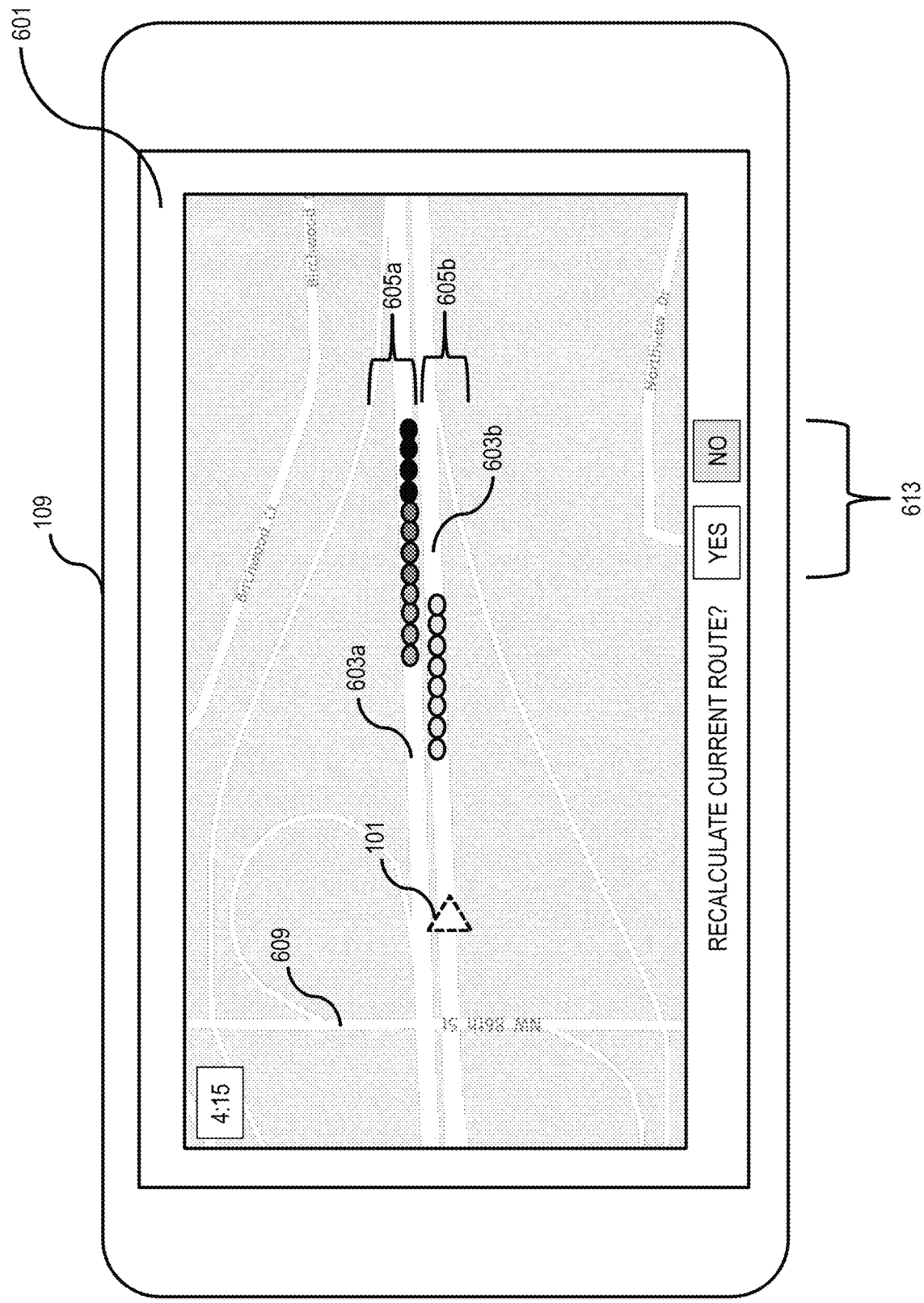

In one embodiment, the system 100 splits and tracks each vehicle path corresponding to the probes 605 by map matching the probes so that probes 605*a* are matched to lane 603*a* and the probes 605*b* are matched to lane 603*b*, as depicted in FIG. 6B. As a result, the system 100 can determine and the user can see that the potentially dangerous slowdown event is limited to lane 603*a* whereas the user and the vehicle 101 are traveling on lane 605*b*. In one embodiment, the system 100 can generate the UI 601 such that it includes inputs 613 so that the user can recalculate the current guidance or route (e.g., if the user and the vehicle 101 were traveling on lane 603*a*). In this example, because the likely disruption to the vehicle 101 and the user appears minor, the user has selected not to recalculate the current route (e.g., to route 609).

Figure 6C:
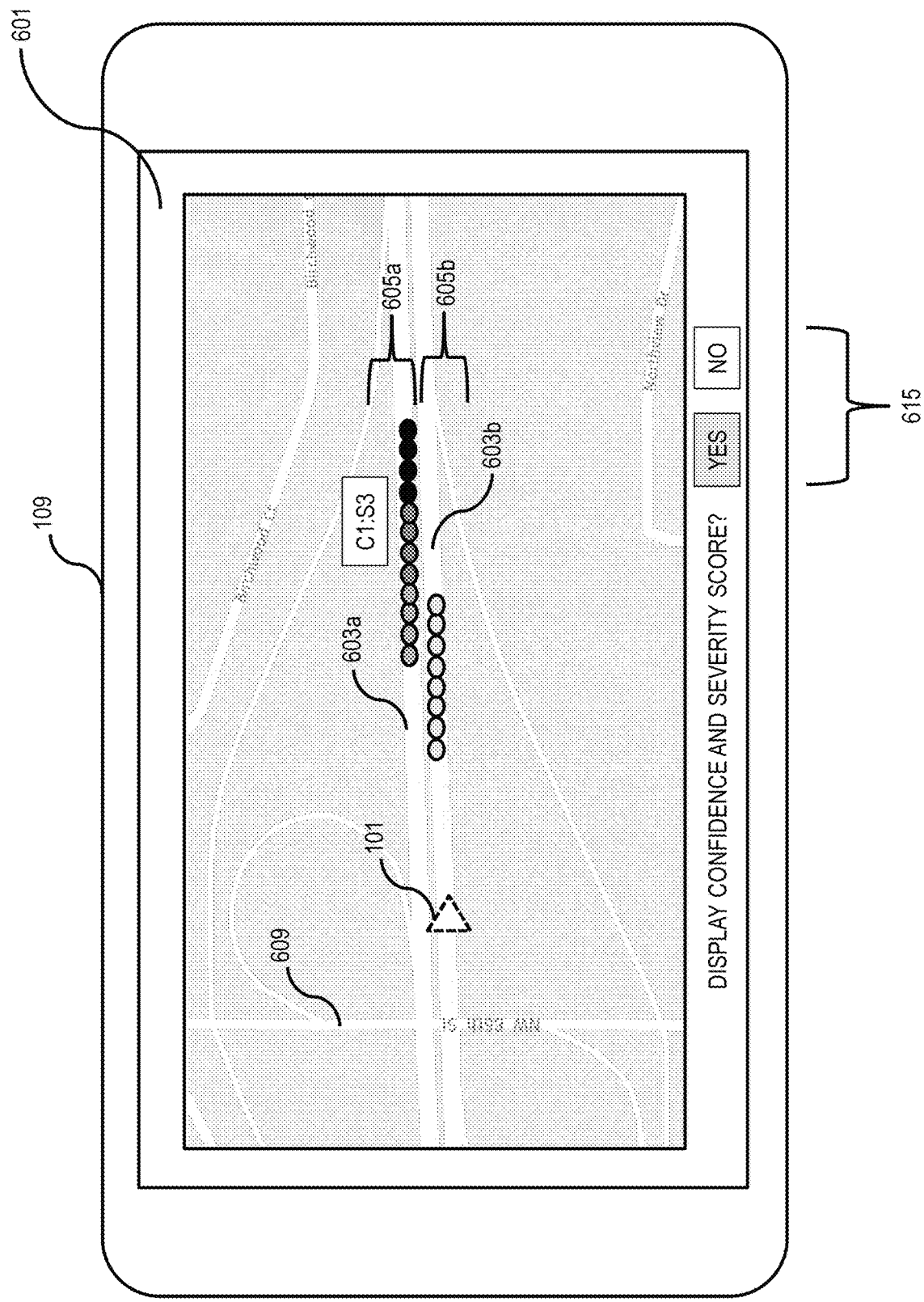

Referring to FIG. 6C, in one embodiment, the system 100 can generate the UI 601 such that it includes inputs 615 so that the user can visualize the confidence value associated with the system 100's detection of the lane-level dangerous slowdown event on lane 603*a* as well as the calculated severity factor of that event. In this example, the system 100 determines that there is a dangerous slowdown event on lane 603*a* with a confidence value 1 (e.g., more likely than not) and that the severity factor is 3 out of 4. As such, the slowdown event on lane 603*a* would likely pose a safety hazard or cause considerable delay to the vehicle 101 and the user if the user was traveling on that lane.

Figure 6D:
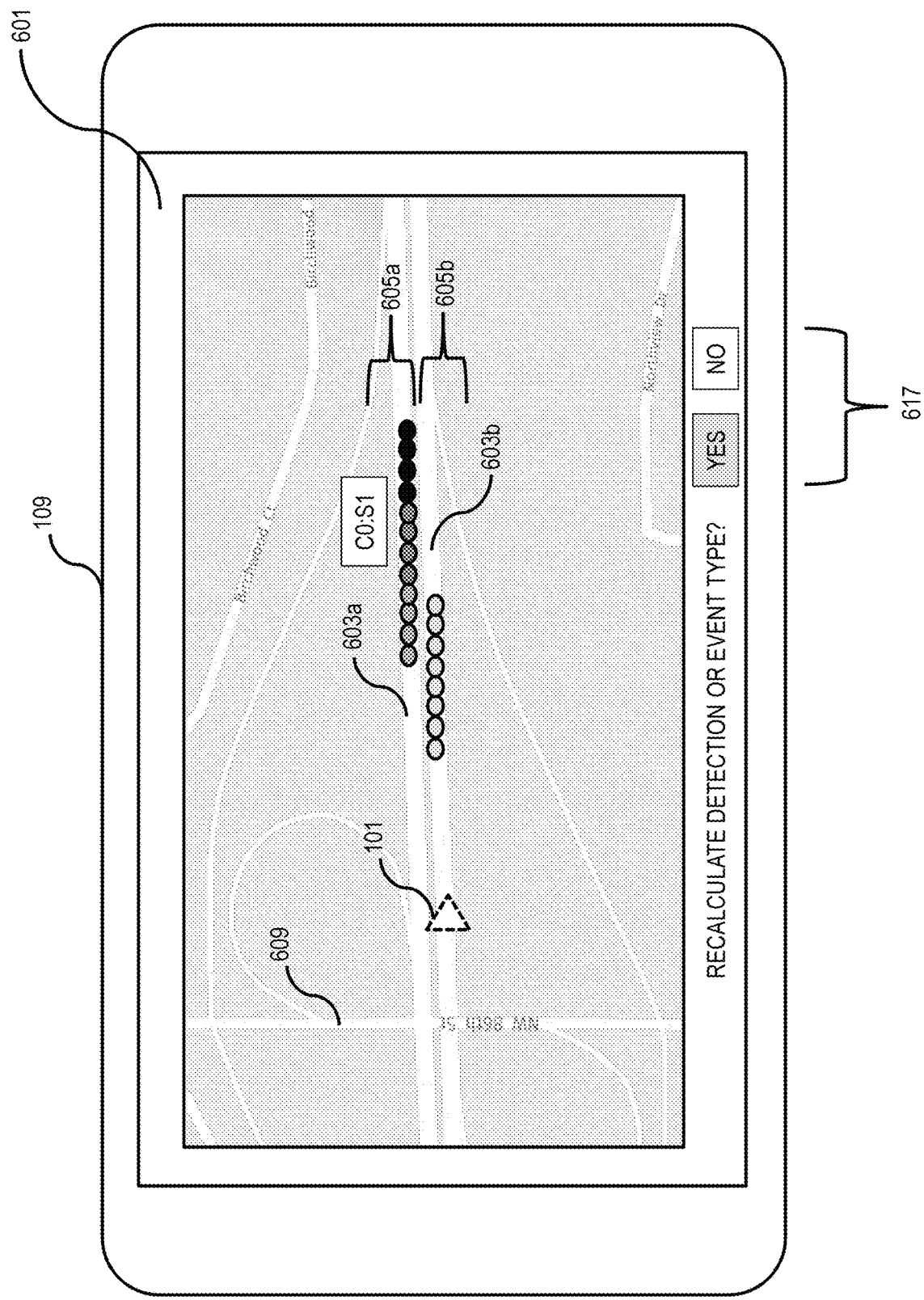

In one embodiment, the system 100 can generate the UI 601 such that it includes inputs 617 to enable a user to prompt the system 100 to recalculate the lane-level dangerous slowdown event detection and/or the characterization of the lane-level dangerous slowdown type, as depicted in FIG. 6D. For example, if the system 100 returns a confidence value of 0 and/or a severity factor that appears inconsistent with the probe data or path visualization the user may want to prompt the system 100 to recalculate. One example may be, if the system 100 determines that the severity factor is 1, but the probes 605 are visualized as being black or dark grey (e.g., representing a standstill). In one embodiment, the inputs 613, 615, and 617 have the same or similar functionality as the inputs 611 in terms of a user's ability to input information.

In one instance, it is contemplated that the system 100 can automatically detect any lane-level dangerous slowdown events on the travel path of the vehicle 101 and recommend or reroute the vehicle 101 to ensure the safety of the vehicle 101, the passengers, and/or other persons or vehicles in the area (e.g., if the confidence value and severity factor reach a certain threshold). In other words, the system 100 may take evasive actions with respect to any dangerous slowdown events without first delivering a dangerous slowdown event message to the user.

Returning to FIG. 1, in one embodiment, the traffic platform 105 has connectivity over the communication network 107 to the services platform 117 (e.g., an OEM platform) that provides one or more services 119*a*-119*n* (also collectively referred to herein as services 119) (e.g., probe and/or sensor data collection services). By way of example, the services 119 may also be other third-party services and include mapping services, navigation services, traffic incident services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 117 uses the output (e.g. lane-level dangerous slowdown event detection and messages) of the traffic platform 105 to provide services such as navigation, mapping, other location-based services, etc.

In one embodiment, the traffic platform 105 may be a platform with multiple interconnected components. The traffic platform 105 may include multiple servers, intelligent networking devices, computing devices, components and corresponding software for providing parametric representations of lane lines. In addition, it is noted that the traffic platform 105 may be a separate entity of the system 100, a part of the services platform 117, a part of the one or more services 119, or included within the vehicles 101 (e.g., an embedded navigation system).

In one embodiment, content providers 121*a*-121*m* (also collectively referred to herein as content providers 121) may provide content or data (e.g., including probe data, sensor data, etc.) to the traffic platform 105, the UEs 109, the applications 111, the probe database 113, the geographic database 115, the services platform 117, the services 119, and the vehicles 101. The content provided may be any type of content, such as map content, textual content, audio content, video content, image content, etc. In one embodiment, the content providers 121 may provide content that may aid in localizing a vehicle path or trajectory on a lane of a digital map or link. In one embodiment, the content providers 121 may also store content associated with the traffic platform 105, the probe database 113, the geographic database 115, the services platform 117, the services 119, and/or the vehicles 101. In another embodiment, the content providers 121 may manage access to a central repository of data, and offer a consistent, standard interface to data, such as a repository of the geographic database 115.

By way of example, the UEs 109 are any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that a UE 109 can support any type of interface to the user (such as "wearable" circuitry, etc.). In one embodiment, a UE 109 may be associated with a vehicle 101 (e.g., a mobile device) or be a component part of the vehicle 101 (e.g., an embedded navigation system). In one embodiment, the UEs 109 may include the traffic platform 105 to detect lane-level dangerous slowdown events based on probe data and/or sensor data.

In one embodiment, as mentioned above, the vehicles 101, for instance, are part of a probe-based system for collecting probe data and/or sensor data for detecting traffic incidents (e.g., dangerous slowdown events) and/or measuring traffic conditions in a road network. In one embodiment, each vehicle 101 is configured to report probe data as probe points, which are individual data records collected at a point in time that records telemetry data for that point in time. In one embodiment, the probe ID can be permanent or valid for a certain period of time. In one embodiment, the probe ID is cycled, particularly for consumer-sourced data, to protect the privacy of the source.

In one embodiment, a probe point can include attributes such as: (1) probe ID, (2) longitude, (3) latitude, (4) heading, (5) speed, and (6) time. The list of attributes is provided by way of illustration and not limitation. Accordingly, it is contemplated that any combination of these attributes or other attributes may be recorded as a probe point. For example, attributes such as altitude (e.g., for flight capable vehicles or for tracking non-flight vehicles in the altitude domain), tilt, steering angle, wiper activation, etc. can be included and reported for a probe point. In one embodiment, the vehicles 101 may include sensors 103 for reporting measuring and/or reporting attributes. The attributes can also be any attribute normally collected by an on-board diagnostic (OBD) system of the vehicle 101, and available through an interface to the OBD system (e.g., OBD II interface or other similar interface).

The probe points can be reported from the vehicles 101 in real-time, in batches, continuously, or at any other frequency requested by the system 100 over, for instance, the communication network 107 for processing by the traffic platform 105. The probe points also can be map matched to specific road links stored in the geographic database 115. In one embodiment, the system 100 (e.g., via the traffic platform 105) can generate probe traces (e.g., vehicle paths or trajectories) from the probe points for an individual probe so that the probe traces represent a travel trajectory or vehicle path of the probe through the road network.

In one embodiment, as previously stated, the vehicles 101 are configured with various sensors (e.g., vehicle sensors 103) for generating or collecting probe data, sensor data, related geographic/map data, etc. In one embodiment, the sensed data represents sensor data associated with a geographic location or coordinates at which the sensor data was collected. In one embodiment, the probe data (e.g., stored in the probe database 113) includes location probes collected by one or more vehicle sensors 103. By way of example, the vehicle sensors 103 may include a RADAR system, a LiDAR system, global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on a steering wheel of the vehicles 101, switch sensors for determining whether one or more vehicle switches are engaged, and the like. Though depicted as automobiles, it is contemplated the vehicles 101 can be any type of vehicle manned or unmanned (e.g., cars, trucks, buses, vans, motorcycles, scooters, drones, etc.) that travel through road segments of a road network.

Other examples of sensors 103 of the vehicle 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle 101 along a path of travel (e.g., while on a hill or a cliff 303), moisture sensors, pressure sensors, etc. In a further example embodiment, sensors 103 about the perimeter of the vehicle 101 may detect the relative distance of the vehicle 101 from a physical divider, a lane line of a link or roadway (e.g., road 201), the presence of other vehicles, pedestrians, traffic lights, potholes and any other objects, or a combination thereof. In one scenario, the vehicle sensors 103 may detect weather data, traffic information, or a combination thereof. In one embodiment, the vehicles 101 may include GPS or other satellite-based receivers 103 to obtain geographic coordinates from satellites 123 for determining current location and time. Further, the location can be determined by visual odometry, triangulation systems such as A-GPS, Cell of Origin, or other location extrapolation technologies.

In one embodiment, the UEs 109 may also be configured with various sensors (not shown for illustrative convenience) for acquiring and/or generating probe data and/or sensor data associated with a vehicle 101, a driver, other vehicles, conditions regarding the driving environment or roadway, etc. For example, such sensors may be used as GPS receivers for interacting with the one or more satellites 123 to determine and track the current speed, position and location of a vehicle 101 travelling along a link or roadway. In addition, the sensors may gather tilt data (e.g., a degree of incline or decline of the vehicle during travel), motion data, light data, sound data, image data, weather data, temporal data and other data associated with the vehicles 101 and/or UEs 109. Still further, the sensors may detect local or transient network and/or wireless signals, such as those transmitted by nearby devices during navigation of a vehicle along a roadway (Li-Fi, near field communication (NFC)) etc.

It is noted therefore that the above described data may be transmitted via communication network 107 as probe data (e.g., GPS probe data) according to any known wireless communication protocols. For example, each UE 109, application 111, user, and/or vehicle 101 may be assigned a unique probe identifier (probe ID) for use in reporting or transmitting said probe data collected by the vehicles 101 and/or UEs 109. In one embodiment, each vehicle 101 and/or UE 109 is configured to report probe data as probe points, which are individual data records collected at a point in time that records telemetry data.

In one embodiment, the traffic platform 105 retrieves aggregated probe points gathered and/or generated by the vehicle sensors 103 and/or the UE 109 resulting from the travel of the UEs 109 and/or vehicles 101 on a road segment of a road network. In one instance, the probe database 113 stores a plurality of probe points and/or trajectories generated by different vehicle sensors 103, UEs 109, applications 111, vehicles 101, etc. over a period while traveling in a monitored area. A time sequence of probe points specifies a trajectory—i.e., a path traversed by a UE 109, application 111, vehicle 101, etc. over the period.

In one embodiment, the communication network 107 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the vehicles 101, vehicle sensors 103, traffic platform 105, UEs 109, applications 111, services platform 117, services 119, content providers 121, and/or satellites 123 communicate with each other and other components of the system 100 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 7:
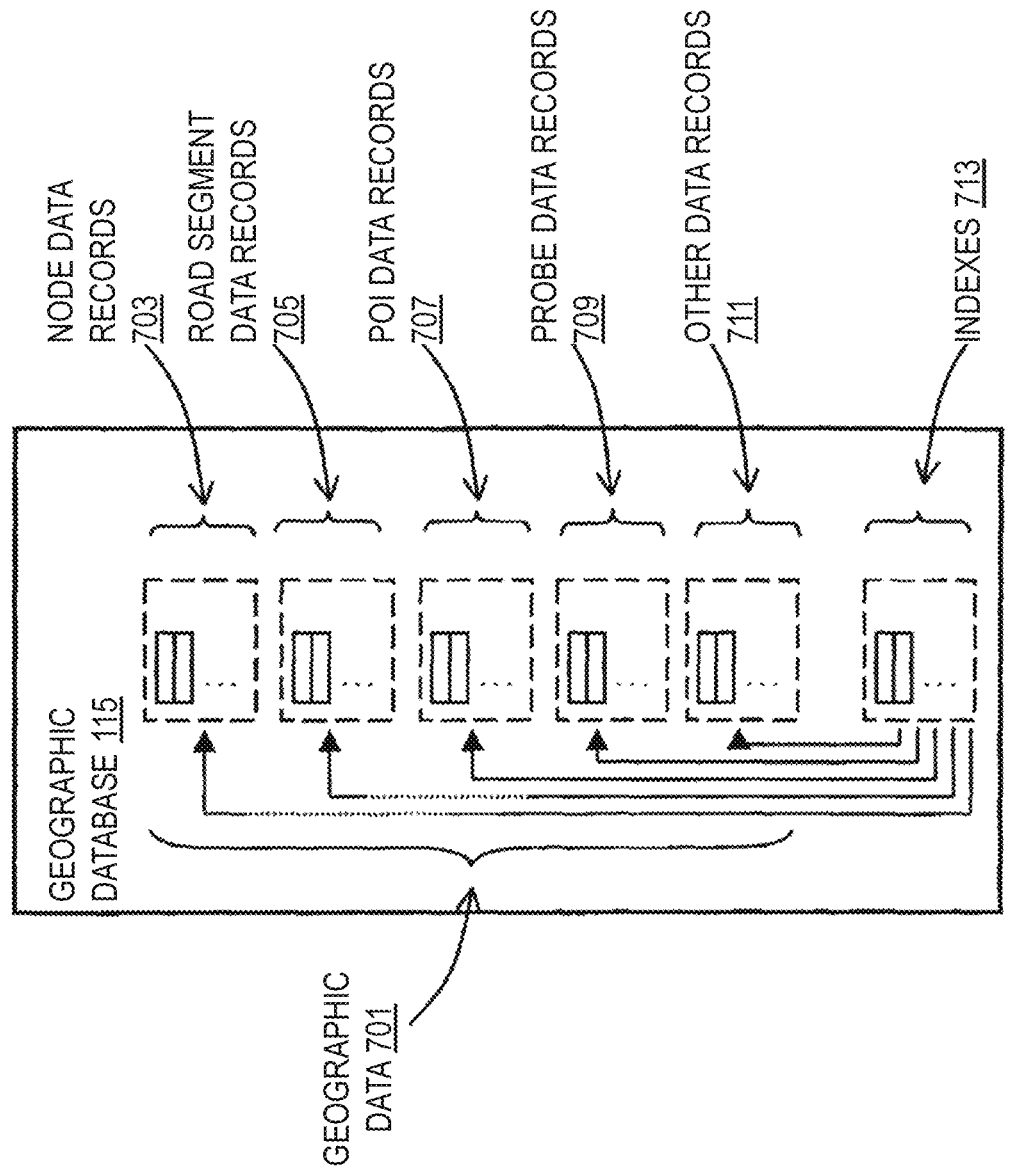
FIG. 7 is a diagram of a geographic database, according to one embodiment.

FIG. 7 is a diagram of a geographic database, according to one embodiment. In exemplary embodiments, probe data can be stored, associated with, and/or linked to the geographic database 115 or data thereof. In one embodiment, the geographic database 115 includes geographic data 701 used for (or configured to be compiled to be used for) mapping and/or navigation-related services, such as for personalized route determination, according to one embodiment. For example, the geographic database 115 includes node data records 703, road segment or link data records 705, POI data records 707, probe data records 709, other data records 711, and indexes 713. More, fewer or different data records can be provided. In one embodiment, the other data records 711 include cartographic ("carto") data records, routing data, and maneuver data. In one embodiment, the probe data (e.g., collected from vehicles 101) can be map-matched to respective map or geographic records via position or GPS data associations (such as using known or future map matching or geo-coding techniques), for example. In one embodiment, the indexes 713 may improve the speed of data retrieval operations in the geographic database 115. The indexes 713 may be used to quickly locate data without having to search every row in the geographic database 115 every time it is accessed.

In various embodiments, the road segment data records 705 are links or segments representing roads, streets, paths, or lanes within multi-lane roads/streets/paths as can be used in the calculated route or recorded route information for determination of one or more personalized routes, according to exemplary embodiments. The node data records 703 are end points corresponding to the respective links or segments of the road segment data records 705. The road segment data records 705 and the node data records 703 represent a road network, such as used by vehicles, cars, and/or other entities. Alternatively, the geographic database 115 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, lane number, and other navigation related attributes, as well as POIs, such as gasoline stations, hotels, restaurants, museums, stadiums, offices, automobile dealerships, auto repair shops, buildings, stores, parks, etc. The geographic database 115 can include data about the POIs and their respective locations in the POI data records 707. The geographic database 115 can also include data about places, such as cities, towns, or other communities, and other geographic features, such as bodies of water, mountain ranges, etc. Such place or feature data can be part of the POI data records 707 or can be associated with POIs or POI data records 707 (such as a data point used for displaying or representing a position within a city).

In one embodiment, the geographic database 115 can include probe data collected from vehicles 101 (e.g., probe vehicles). As previously discussed, the probe data include probe points collected from the vehicles 101 and include telemetry data from the vehicles 101 can be used to indicate the traffic conditions at the location in a roadway from which the probe data was collected. In one embodiment, the probe data can be map-matched to the road network or roadways stored in the probe database 113, the geographic database 115, or a combination thereof. In one embodiment, the probe data can be further map-matched to individual lanes (e.g., any of the travel lanes, shoulder lanes, restricted lanes, service lanes, etc.) of the roadways for subsequent processing according to the various embodiments described herein. By way of example, the map-matching can be performed by matching the geographic coordinates (e.g., longitude and latitude) recorded for a probe-point against a roadway or lane within a multi-lane roadway corresponding to the coordinates.

The geographic database 115 can be maintained by a content provider 121 in association with the services platform 117 (e.g., a map developer). The map developer can collect geographic data to generate and enhance the geographic database 115. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In one embodiment, the data can include incident reports which can then be designated as ground truths for training a machine learning classifier to classify a traffic from probe data. Different sources of the incident report can be treated differently. For example, incident reports from municipal sources and field personnel can be treated as ground truths, while crowd-sourced reports originating from the general public may be excluded as ground truths.

The geographic database 115 can be a master geographic database stored in a format that facilitates updating, maintenance, and development. For example, the master geographic database 115 or data in the master geographic database 115 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 109, for example. The navigation-related functions can correspond to vehicle navigation, pedestrian navigation, or other types of navigation. The compilation of the mapping and/or probe data to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 115 can be a master geographic database, but in alternate embodiments, the geographic database 115 can represent a compiled navigation database that can be used in or with end user devices (e.g., UEs 109) to provide navigation-related functions. For example, the geographic database 115 can be used with the end user device UE 109 to provide an end user with navigation features. In such a case, the geographic database 115 can be downloaded or stored on the end user device UE 109, such as in applications 111, or the end user device UE 109 can access the geographic database 115 through a wireless or wired connection (such as via a server and/or the communication network 107), for example.

The processes described herein for detecting lane-level dangerous slowdown events based on probe data and/or sensor data may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
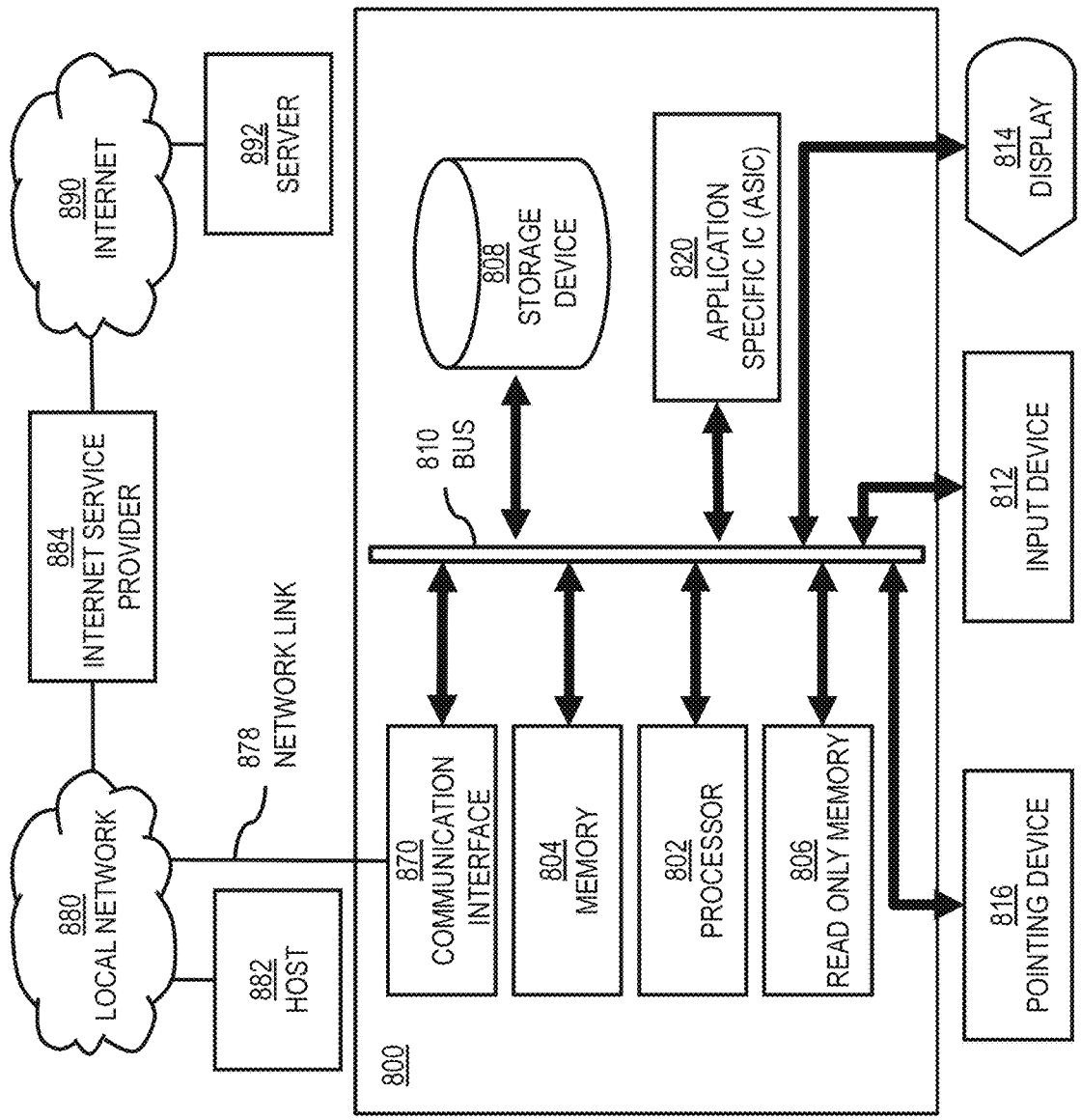
FIG. 8 is a diagram of hardware that can be used to implement an embodiment.

FIG. 8 illustrates a computer system 800 upon which an embodiment of the invention may be implemented. Computer system 800 is programmed (e.g., via computer program code or instructions) to detect lane-level dangerous slowdown events based on probe data and/or sensor data as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 810 includes one or more parallel conductors of information so that information is transferred quickly among devices coupled to the bus 810. One or more processors 802 for processing information are coupled with the bus 810.

A processor 802 performs a set of operations on information as specified by computer program code related to detecting lane-level dangerous slowdown events based on probe data and/or sensor data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for detecting lane-level dangerous slowdown events based on probe data and/or sensor data. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for detecting lane-level dangerous slowdown events based on probe data and/or sensor data, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general, the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 107 for detecting lane-level dangerous slowdown events based on probe data and/or sensor data.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 9 illustrates a chip set 900 upon which an embodiment of the invention may be implemented. Chip set 900 is programmed to detect lane-level dangerous slowdown events based on probe data and/or sensor data as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA)

(not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to detect lane-level dangerous slowdown events based on probe data and/or sensor data. The memory 905 also stores the data associated with or generated by the execution of the inventive steps.

Figure 10:
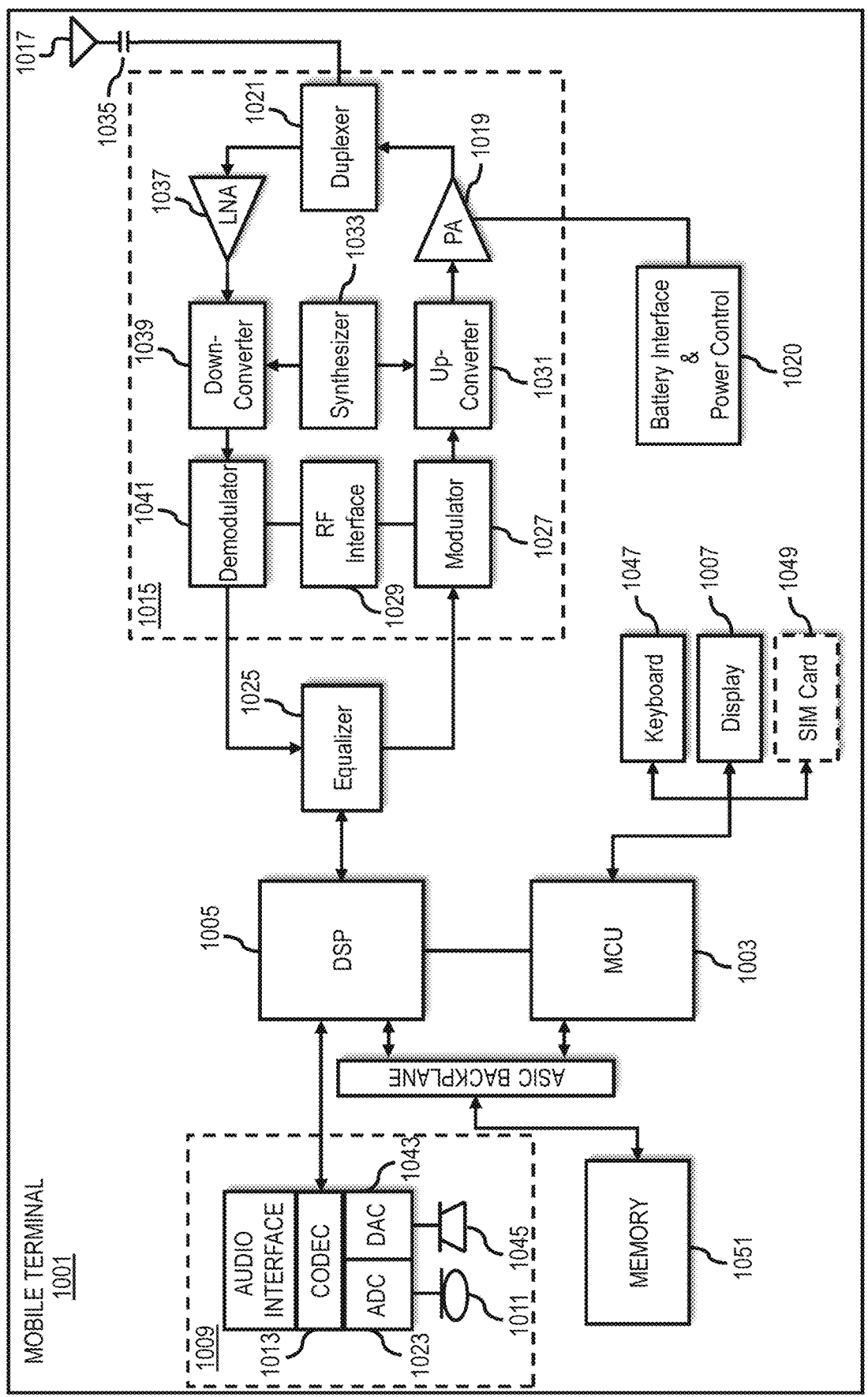
FIG. 10 is a diagram of a mobile terminal (e.g., handset or vehicle or part thereof) that can be used to implement an embodiment.

FIG. 10 is a diagram of exemplary components of a mobile terminal 1001 (e.g., a vehicle 101, a UE 109, or component thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the backend encompasses all of the base-band processing circuitry. Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions that offer automatic contact matching. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile station 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a landline connected to a Public Switched Telephone Network (PSTN), or other telephony networks.

Voice signals transmitted to the mobile station 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile station 1001 to detect lane-level dangerous slowdown events based on probe data and/or sensor data. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile station 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1051 may be, but not limited to, a single memory, CD, DVD, ROM, RAM, EEPROM, optical storage, or any other non-volatile or non-transitory storage medium capable of storing digital data.

An optionally incorporated SIM card 1049 carries, for instance, important information, such as the cellular phone number, the carrier supplying service, subscription details, and security information. The SIM card 1049 serves primarily to identify the mobile station 1001 on a radio network. The card 1049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    splitting probe data, sensor data, or a combination thereof into a plurality of vehicle trajectories wherein the probe data, the sensor data, or a combination thereof is collected from a plurality of vehicles traveling on a road segment;
    correlate each drive of each of the plurality of vehicles to a corresponding lane of a road segment by map matching the probe data, sensor data, or a combination thereof;
    for each vehicle trajectory of the at least one vehicle trajectory, processing said each vehicle trajectory to detect a slowdown event of the corresponding lane based on a speed reduction greater than a threshold reduction;
    classifying a slowdown event type of the slowdown event based on a final driving location, a final driving speed, or a combination thereof of the at least one vehicle trajectory; and
    providing the slowdown event, the slowdown event type, or a combination thereof as a message output for the road segment across a communication network to a plurality of displays of user devices in a geographic area,
    wherein the message output is displayed on the displays and includes a confidence value associated with the detection of the slowdown event of the corresponding lane and a calculated severity factor of the slowdown event.

2. The method of claim 1, wherein the at least one vehicle trajectory is map-matched to a lane-level of the road segment, and wherein the slowdown event, the slowdown event type, or a combination thereof is determined with respect to the lane-level.

3. The method of claim 1, wherein the slowdown event is further detected based on determining that the speed reduction occurred within a threshold time window, a threshold distance, or a combination thereof.

4. The method of claim 1, wherein the threshold reduction is a percent reduction from an initial speed.

5. The method of claim 1, further comprising:
    determining vehicle control sensor data indicating a position of at least one vehicle control mechanism,
    wherein the slowdown event, the slowdown event type, or a combination is further determined based on the vehicle control sensor data.

6. The method of claim 1, wherein the slowdown event, the slowdown event type, or a combination thereof is further based on determining that the final driving location indicates that the slowdown event occurs on a single lane of the road segment.

7. The method of claim 1, wherein the slowdown event, the slowdown event type, or a combination thereof is further based on determining that the final driving location indicates that the slowdown event starts on a first lane of the road segment and ends on a second lane of the road segment.

8. The method of claim 1, wherein the slowdown event, the slowdown event type, or a combination thereof is further based on determining that the final driving location indicates that the slowdown event starts on a travel lane of the road segment and ends on a non-travel lane of the road segment; and wherein the non-travel lane includes a shoulder lane or an off-road area of the road segment.

9. The method of claim 1, wherein the slowdown event, the slowdown event type, or a combination thereof is further based on comparing the final driving speed to a speed threshold, at least another speed threshold, or a combination thereof.

10. The method of claim 1, wherein the slowdown event is a vehicle stop event, a vehicle fall-over event, or a combination thereof.

11. An apparatus comprising:
    at least one processor; and
    at least one memory including computer program code for one or more programs,
    the at least one memory and the computer program code configured to, with the at least one processor, cause the apparatus to perform at least the following,
    split probe data, sensor data, or a combination thereof into a plurality of vehicle trajectories, wherein the probe data, the sensor data, or a combination thereof is collected from a plurality of vehicles traveling on a road segment;
    correlate each drive of each of the plurality of vehicles to a corresponding lane of a road segment by map matching the probe data, sensor data, or a combination thereof;
    for each vehicle trajectory of the at least one vehicle trajectory, process said each vehicle trajectory to detect a slowdown event of the corresponding lane based on a speed reduction greater than a threshold reduction;
    classify a slowdown event type of the slowdown event based on a final driving location, a final driving speed, or a combination thereof of the at least one vehicle trajectory; and
    provide the slowdown event, the slowdown event type, or a combination thereof as a message output for the road segment across a communication network to a plurality of displays of user devices in a geographic area,
    wherein the message output is displayed on the displays and includes a confidence value associated with the detection of the slowdown event of the corresponding lane and a calculated severity factor of the slowdown event.

12. The apparatus of claim 11, wherein the at least one vehicle trajectory is map-matched to a lane-level of the road segment, and wherein the slowdown event, the slowdown event type, or a combination thereof is determined with respect to the lane-level.

13. The apparatus of claim 11, wherein the slowdown event is further detected based on determining that the speed reduction occurred within a threshold time window, a threshold distance, or a combination thereof.

14. The apparatus of claim 11, wherein the threshold reduction is a percent reduction from an initial speed.

15. The apparatus of claim 11, wherein the apparatus is further caused to:
    determine vehicle control sensor data indicating a position of at least one vehicle control mechanism, wherein the slowdown event, the slowdown event type, or a combination is further determined based on the vehicle control sensor data.

16. The apparatus of claim 11, wherein the slowdown event, the slowdown event type, or a combination thereof is further based on determining that the final driving location indicates that the slowdown event occurs on a single lane of the road segment.

17. The apparatus of claim 11, wherein the slowdown event, the slowdown event type, or a combination thereof is further based on determining that the final driving location indicates that the slowdown event starts on a first lane of the road segment and ends on a second lane of the road segment.

18. A non-transitory computer-readable storage medium, carrying one or more sequences of one or more instructions which, when executed by one or more processors, cause an apparatus to at least perform the following steps:

splitting probe data, sensor data, or a combination thereof into a plurality of vehicle trajectories, wherein the probe data, the sensor data, or a combination thereof is collected from a plurality of vehicles traveling on a road segment;

correlating each drive of each of the plurality of vehicles to a corresponding lane of a road segment by map matching the probe data, sensor data, or a combination thereof;

for each vehicle trajectory of the at least one vehicle trajectory, processing said each vehicle trajectory to detect a lane-level slowdown event of the corresponding lane based on a speed reduction greater than a threshold reduction;

classifying a lane-level slowdown event type of the lane-level slowdown event based on a final driving location, a final driving speed, or a combination thereof of the at least one vehicle trajectory; and providing the lane-level slowdown event, the lane level slowdown event type, or a combination thereof as a message output for the road segment across a communication network to a plurality of displays of user devices in a geographic area, wherein the message output is displayed on the displays and includes a confidence value associated with the detection of the slowdown event of the corresponding lane and a calculated severity factor of the slowdown event.

19. The non-transitory computer-readable storage medium of claim 18, wherein the at least one vehicle trajectory is map-matched to a lane-level of the road segment.

20. The non-transitory computer-readable storage medium of claim 18, wherein the lane-level slowdown event is further detected based on determining that the speed reduction occurred within a threshold time window, a threshold distance, or a combination thereof.

* * * * *